US008521984B2

(12) United States Patent
Asano et al.

(10) Patent No.: US 8,521,984 B2
(45) Date of Patent: Aug. 27, 2013

(54) COMPUTER SYSTEM AND CONTROL METHOD THEREFOR

(75) Inventors: Masayasu Asano, Yokohama (JP); Koichi Murayama, Kasawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/357,240

(22) Filed: Jan. 24, 2012

(65) Prior Publication Data

US 2012/0124321 A1 May 17, 2012

Related U.S. Application Data

(63) Continuation of application No. 12/269,425, filed on Nov. 12, 2008, now Pat. No. 8,127,093.

(30) Foreign Application Priority Data

Sep. 22, 2008 (JP) ................ 2008-242347

(51) Int. Cl.
*G06F 12/00* (2006.01)
(52) U.S. Cl.
USPC ............................ 711/170; 711/161; 711/162
(58) Field of Classification Search
USPC .......................................... 711/161, 162, 170
See application file for complete search history.

(56) References Cited

U.S. PATENT DOCUMENTS

| 5,537,585 | A * | 7/1996 | Blickenstaff et al. ............... 1/1 |
| 8,041,735 | B1 * | 10/2011 | Lacapra et al. ............... 707/783 |
| 2005/0091455 | A1 | 4/2005 | Kano et al. |
| 2006/0212481 | A1 * | 9/2006 | Stacey et al. ............... 707/104.1 |
| 2006/0253549 | A1 | 11/2006 | Arakawa et al. |
| 2007/0016621 | A1 * | 1/2007 | Havewala et al. ............. 707/200 |
| 2007/0073988 | A1 | 3/2007 | Shibayama et al. |
| 2007/0079100 | A1 * | 4/2007 | Shiga et al. ............... 711/170 |
| 2007/0113007 | A1 | 5/2007 | Murayama et al. |
| 2007/0168567 | A1 * | 7/2007 | Boyd et al. ............... 710/5 |
| 2007/0226447 | A1 | 9/2007 | Shimozono et al. |
| 2009/0150639 | A1 | 6/2009 | Ohata |

FOREIGN PATENT DOCUMENTS

| JP | 2003-015915 | 1/2003 |
| JP | 2007-257317 | 10/2007 |

* cited by examiner

*Primary Examiner* — Hashem Farrokh
(74) *Attorney, Agent, or Firm* — Foley & Lardner LLP

(57) ABSTRACT

A physical storage area that is allocated to an unused area of a virtual volume is removed. A management unit sends a request to a server computer to make every piece of data stored in a first logical volume migrate to a second logical volume. The server reads all the data out of the first logical volume and writes the data in the second logical volume. A storage system that includes the first logical volume and the second logical volume allocates a physical storage area to an area of the second logical volume where the data is to be written, and writes the data in the allocated physical storage area. The storage system then deletes the first logical volume.

18 Claims, 22 Drawing Sheets

VIRTUAL POOL TABLE 9000

| VIRTUAL POOL ID (9000) | VIRTUAL POOL VOLUME ID (9010) | CHUNK ID (9020) | ALLOCATED LBA (9030) | ALLOCATION STATE (9040/9050) |
|---|---|---|---|---|
| P1 | V100 | C11 | 0G—2G | ALLOCATED(V1) |
| P1 | V100 | C12 | 2G—4G | ALLOCATED(V1) |
| P1 | V101 | C13 | 0G—2G | ALLOCATED(V2) |
| P1 | V101 | C14 | 2G—4G | ALLOCATED(V1) |
| P1 | V101 | C15 | 4G—6G | UNALLOCATED |
| P2 | V102 | C21 | 0G—2G | UNALLOCATED |
| P2 | V102 | C22 | 2G—4G | UNALLOCATED |
| P3 | V103 | C31 | 0G—2G | ALLOCATED(V5) |
| P3 | V104 | C32 | 0G—2G | ALLOCATED(V5) |
| P3 | V104 | C33 | 2G—4G | UNALLOCATED |
| P3 | V104 | C34 | 4G—6G | UNALLOCATED |
| P11 | V105 | C111 | 0G—2G | ALLOCATED(V11) |
| P11 | V106 | C112 | 0G—2G | UNALLOCATED |
| P11 | V106 | C113 | 2G—4G | UNALLOCATED |
| P12 | V107 | C121 | 0G—2G | ALLOCATED(V12) |
| P12 | V107 | C122 | 2G—4G | UNALLOCATED |
| P12 | V107 | C123 | 4G—6G | UNALLOCATED |
| P13 | V108 | C131 | 0G—2G | ALLOCATED(V15) |
| P13 | V108 | C132 | 2G—4G | UNALLOCATED |
| P13 | V108 | C133 | 4G—6G | UNALLOCATED |
| P13 | V109 | C134 | 0G—2G | UNALLOCATED |
| P13 | V109 | V135 | 2G—4G | UNALLOCATED |
| P20 | V110 | C201 | 0G—2G | UNALLOCATED |
| P21 | V111 | C202 | 0G—2G | UNALLOCATED |

*FIG. 9*

VIRTUAL VOLUME ALLOCATION TABLE 10000

| VIRTUAL VOLUME ID | VIRTUAL POOL ID | CHUNK ID | ALLOCATED LBA |
|---|---|---|---|
| V1 | P1 | C11 | 0G — 2G |
| V1 | P1 | C12 | 2G — 4G |
| V1 | P1 | C14 | 4G — 6G |
| V2 | P1 | C13 | 2G — 4G |
| V5 | P3 | C31 | 0G — 2G |
| V5 | P3 | C32 | 2G — 4G |
| V11 | P11 | C111 | 2G — 4G |
| V12 | P12 | C121 | 0G — 2G |
| V15 | P13 | C131 | 0G — 2G |

FIG. 10

SERVER VOLUME TABLE 11000

| SERVER VOLUME | CAPACITY | USED CAPACITY | FILE |
|---|---|---|---|
| V1000 | 2T | 200G | F1、F2、F3、~~F4~~ |
| V2000 | 800G | 150G | F5、F6 |

Columns: 11000, 11010, 11020, 11030, 11040

FIG. 11

COMPUTER SYSTEM AND CONTROL METHOD THEREFOR

CROSS-REFERENCE TO RELATED PATENT APPLICATIONS

Japan Priority Application JP 2008-242347, filed Sep. 22, 2008 including the specification, drawings, claims and abstract, is incorporated herein by reference in its entirety. This application is a Continuation of U.S. application Ser. No. 12/269,425, filed Nov. 12, 2008, incorporated herein by reference in its entirety.

BACKGROUND

This invention relates to storage area management of automatically expandable storage system volumes in a computer system that uses a computer and a storage system.

In a common computer system that uses a computer and a storage system, the computer stores data in a storage area provided by the storage system. When the computer has more data to store, the capacity of the storage area (hereinafter also referred to as volume) needs to be expanded.

One way to expand a volume is stopping the operation of the computer system temporarily and, after the volume is expanded, allowing the computer system to resume the use of the volume. A drawback of this volume expansion method is that it halts the business operation. JP 2003-15915 A overcomes the drawback by automatically expanding the actual capacity of a storage system volume enough to compensate a capacity shortage caused by data write to the volume, without changing the computer-recognized volume capacity.

A volume that can be managed without changing the computer-recognized volume capacity may be referred to as a virtual volume in the following description. An area including physical storage area that is used to expand volume capacity to compensate a capacity shortage caused by data write to the volume may hereinafter be referred to as a virtual pool. A volume registered to a virtual pool may hereinafter be referred to as a virtual pool volume. An area allocated in order to expand the capacity enough to accommodate data write to a virtual volume may hereinafter be referred to as an allocated area.

JP 2007-257317 A discloses a technique of removing the above-mentioned allocated area of a virtual volume. With this technique, a file server and a storage system share information on the state of each area that meets the above-mentioned definition of an allocated area, and the file server removes an allocated area that is not in use.

SUMMARY

Those conventional techniques have the following problems.

Firstly, those techniques pay no attention to low versatility which results from the need for a mode of transmitting the state of the above-mentioned allocated area of a virtual volume between the file server and the storage system.

Secondly, those techniques require the file server to check with the storage system upon access to the storage system about the virtual volume-allocated area. In the case where there is a discrepancy between the virtual volume-allocated area and an area used by the file server, the check takes long and makes the techniques inefficient.

The following measure is employed to solve the above-mentioned problems.

A technique of making files migrate in a manner transparent to hosts (hereinafter also referred to as transparent file migration technique) has already been proposed for file servers. This technique is implemented with, for example, a file virtualization function used to manage a plurality of file systems and server volumes as a single name space. A file server uses the transparent file migration technique to make all files migrate from a virtual volume whose allocated areas include many physical areas that are not used by the file server to another virtual volume. Then, the virtual volume from which the files have migrated is deleted. Thus, a virtual volume to which only physical areas used by the file server are allocated is created.

According to a representative invention disclosed in this application, there is provided a computer system, comprising: a first storage system; a first server computer which is coupled to the first storage system; and a management unit which manages the first storage system and the first server computer, wherein the first storage system comprises storage media, which have a plurality of physical storage areas, and a controller, which defines a plurality of logical volumes using the storage media to control data write to the storage media and data read out of the storage media, wherein the first storage system makes at least one of the plurality of logical volumes recognizable to the first server computer, wherein each of the plurality of logical volumes has a storage area space including a plurality of address ranges, wherein, upon reception of a request to write data in one of the plurality of address ranges, the first storage system allocates at least one of the plurality of physical storage areas, that is not allocated to any of the plurality of address ranges, to the one of the plurality of address ranges where the data is requested to be written, and stores the data requested to be written in the allocated physical storage area, wherein the plurality of logical volumes include a first logical volume and a second logical volume, wherein the plurality of address ranges in the second logical volume are not allocated the plurality of physical storage areas, wherein the first server computer comprises a first interface, which communicates with the first storage system, a first processor, which is coupled to the first interface, and a first memory, which is coupled to the first processor, wherein the first server computer holds information identifying data stored in the first logical volume, wherein the management unit sends a request to the first server computer to make every piece of data stored in the first logical volume migrate to the second logical volume, wherein, upon reception of the request to make the data migrate, the first server computer sends to the first storage system a request to read every piece of data stored in the plurality of address ranges of the first logical volume and a request to write the every piece of data in the plurality of address ranges of the second logical volume, wherein, after the every piece of data has been written in the plurality of address ranges of the second logical volume, the management unit sends a request to the first storage system to delete the first logical volume, and wherein, upon reception of the request to delete the first logical volume, the first storage system deletes the first logical volume.

According to an embodiment of this invention, a computer system can remove an allocated area of a virtual volume in a manner transparent to hosts without needing a mode exclusive to transmission between a file server and a storage system. Further, since only the capacity of a file that is to migrate needs to be considered in reducing the volume capacity, the computer system can reduce the volume capacity without being aware of the allocation state of a virtual volume.

BRIEF DESCRIPTION OF THE DRAWINGS

FIG. 9 is an explanatory diagram showing an example of a table for managing an allocation state of each virtual pool that is included in the storage system configuration information of the storage system according to the first embodiment of this invention.

FIG. 10 is an explanatory diagram showing an example of a table for managing an allocation state of each virtual volume that is included in the storage system configuration information of the storage system according to the first embodiment of this invention.

FIG. 11 is an explanatory diagram showing an example of server volume information of the server according to the first embodiment of this invention.

DETAILED DESCRIPTION OF THE PREFERRED EMBODIMENTS

The best mode of carrying out this invention will be described.

A detailed description will be given below with reference to the accompanying drawings on embodiments of this invention.

Described first is a first embodiment of this invention.

FIGS. 1, 2, 3, 4, and 5 are diagrams showing an example of a configuration of a computer system according to the first embodiment of this invention.

Figure 1:
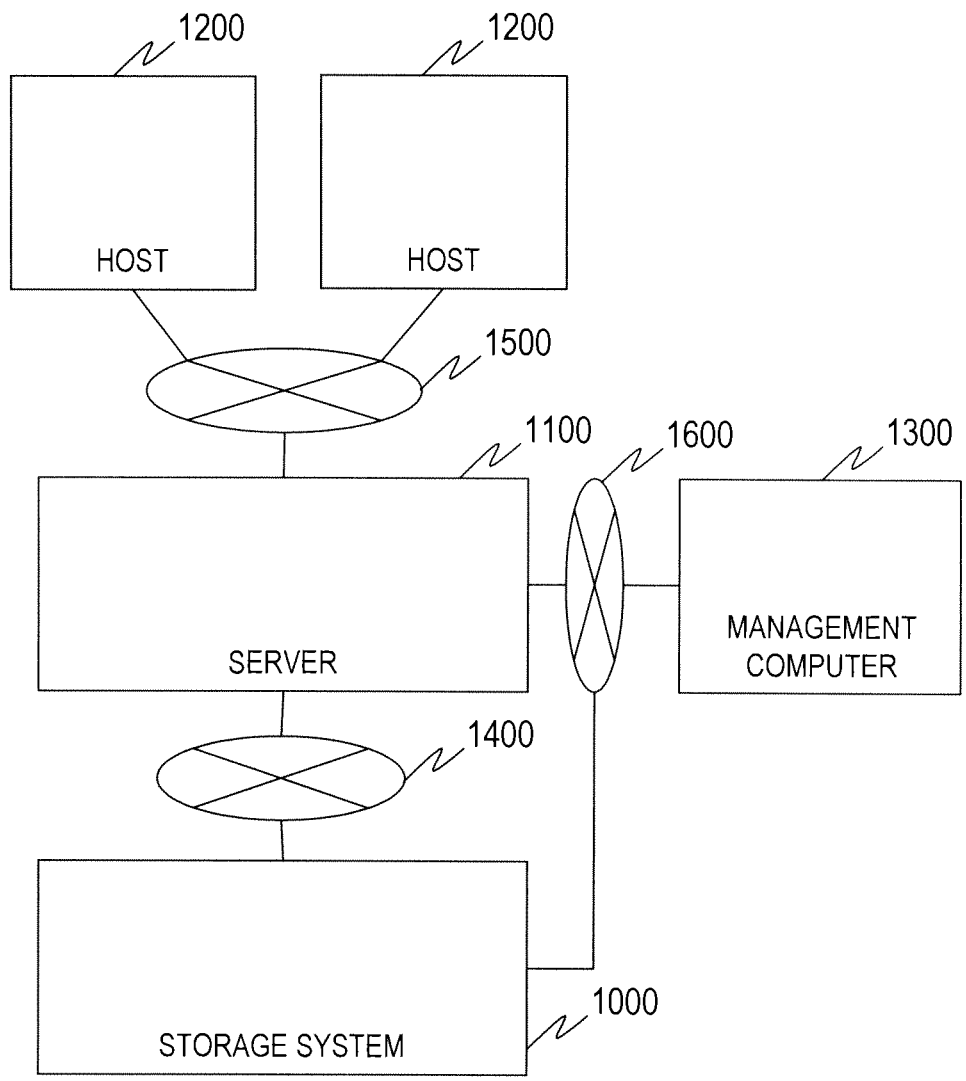
FIG. 1 is an example of a block diagram showing coupling relations between components of a computer system according to a first embodiment of this invention.

FIG. 1 is an example of a block diagram showing coupling relations between components of the computer system according to the first embodiment of this invention.

At least one host 1200 and a server 1100 are coupled to each other by a second network 1500. The server 1100 receives data input/output requests from the host 1200.

The server 1100 and a storage system 1000 are coupled to each other by a first network 1400. The storage system 1000 receives data input/output executed by the server 1100 in response to data input/output requests of the host 1200.

A management computer 1300, the server 1100, and the storage system 1000 are coupled to one another by a management network 1600. The management computer 1300 obtains management information of the server 1100 and the storage system 1000 over the management network 1600. In some cases, the server 1100 and the storage system 1000 send management information to the management computer 1300 over the management network 1600.

This computer system creates a network file system environment between the server 1100 and the host 1200 through the second network 1500. For example, file access is executed by installing in each host 1200 a network file system client that is implemented by a normal OS and installing in the server 1100 a network file system server that is implemented by a normal OS.

The second network 1500 is usually a TCP/IP network, but may be any type of network as long as the network file system environment can be created.

The server 1100 may be implemented as a controller of Network Attached Storage (NAS). Instead of including the host 1200 in the computer system, a business operation (application) program may be run on the server 1100.

The server 1100 accesses the storage system 1000 on a block level. Therefore, while Fibre Channel (FC) would usually be chosen for the first network 1400, any type of network can be the first network 1400 as long as it allows block-level access. For example, the first network 1400 may be a TCP/IP network that employs the iSCSI protocol or the like. Alternatively, the server 1100 may include the storage system 1000, in which case the first network 1400 is an internal bus of the server 1100 and the server 1100 implements the functions of the storage system 1000.

The management network 1600 to which the management computer 1300, the server 1100, and the storage system 1000 are coupled can be any type of network as long as the management computer 1300 can obtain management information over the network. In the case where different protocols are employed between the management computer 1300 and the server 1100 and between the management computer 1300 and the storage system 1000, separate management networks may be used to couple the former two and to couple the latter two.

For example, a TCP/IP network may serve as a management network that couples the management computer 1300 and the server 1100 while an FC network serves as a management network that couples the management computer 1300 and the storage system 1000. Further, in the case where separate management networks are provided for the storage system 1000 and for the server 1100, the management network for the storage system 1000 and the management network for the server 1100 may each include two types of management network (in the above-mentioned example, a TCP/IP network and an FC network).

Figure 2:
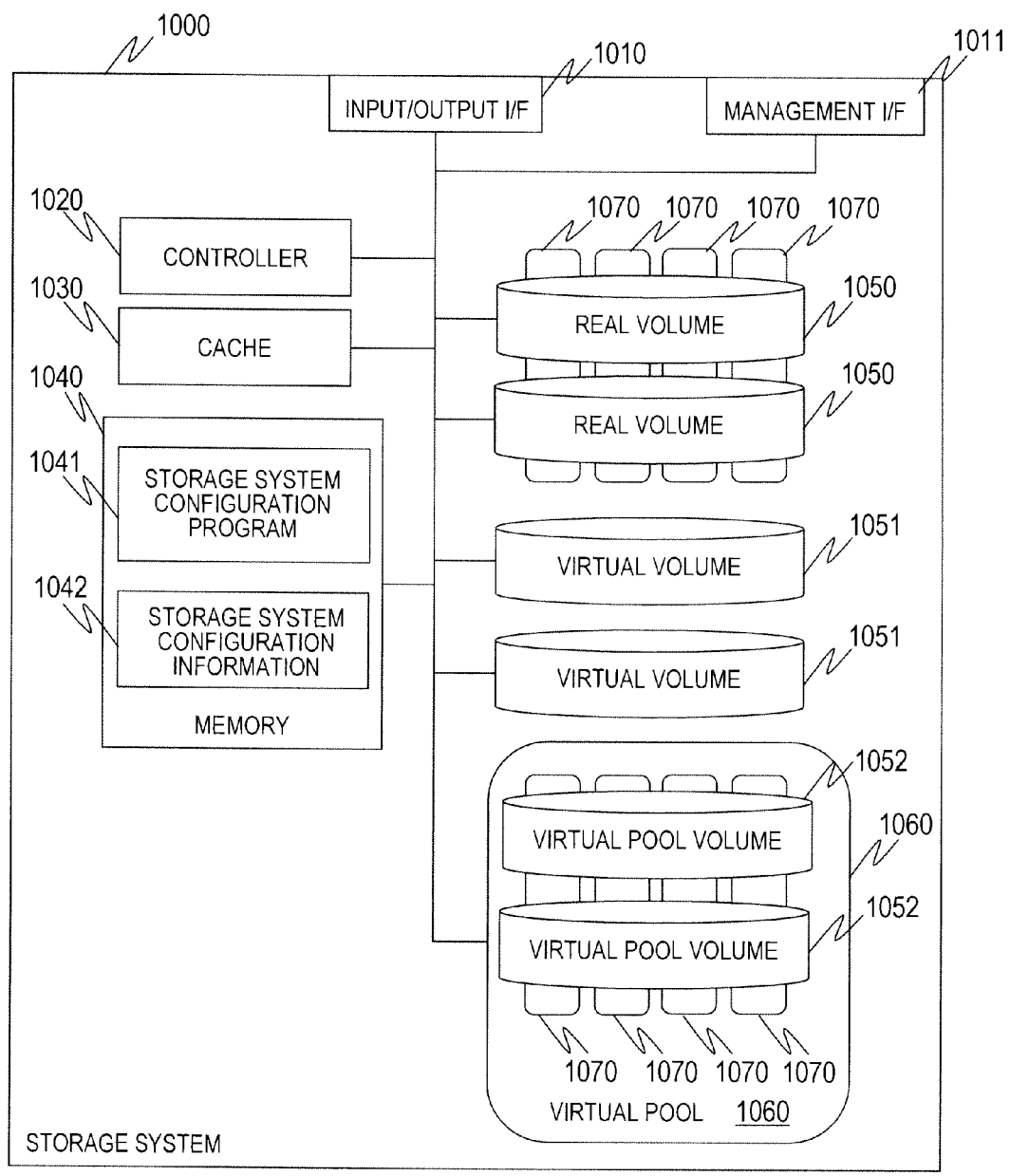
FIG. 2 is an example of a block diagram showing a configuration of a storage system as a component of the computer system according to the first embodiment of this invention.

FIG. 2 is an example of a block diagram showing a configuration of the storage system 1000 as a component of the computer system according to the first embodiment of this invention.

The storage system 1000 has an input/output I/F 1010, a management I/F 1011, a controller 1020, a cache 1030, a memory 1040, at least one hard disk 1070, at least one real volume 1050, at least one virtual volume 1051, and at least one virtual pool volume 1052.

The input/output I/F 1010 is coupled to the first network 1400 to send and receive data I/O relevant to read and write of the server 1100.

The management I/F 1011 is coupled to the management network 1600 to execute communications relevant to operation requests made by the management computer 1300.

The controller 1020 operates the storage system 1000. The controller 1020 may include a processor that runs a program stored in the memory 1040.

The cache 1030 is used to improve the performance of the storage system 1000. The cache 1030 is, for example, a semiconductor memory that temporarily stores at least one of data to be written in the hard disk 1070 and data read out of the hard disk 1070.

The real volumes 1050 may be provided as storage areas to the server 1100, or may be newly defined as the virtual pool volumes 1052.

The virtual volumes 1051 are provided as storage areas to the server 1100.

The virtual pool volumes 1052 are storage areas that store data in order to provide the virtual volumes 1051.

At least one virtual pool volume 1052 constitutes one virtual pool 1060. The virtual pool 1060 defines the extent of the virtual pool volumes 1052 that provide storage areas to a specific virtual volume 1051.

The memory 1040 is, for example, a semiconductor memory, and stores a storage system configuration program 1041 and storage system configuration information 1042. The storage system configuration program 1041 is executed by the controller 1020. The storage system configuration information 1042 is used by the storage system configuration program 1041 and is management information of the storage system 1000.

The storage system configuration program 1041 is a program that manages the configuration of the storage system 1000. Specifically, the storage system configuration program 1041 has functions of a storage system including a function of creating the real volumes 1050, the virtual volumes 1051, the virtual pool volumes 1052, and the virtual pools 1060, a function of allocating a physical storage area of a virtual pool volume to a virtual volume, a function of making the real volumes 1050 and the virtual volumes 1051 recognizable to the server 1100 and other computers through the input/output I/F 1010, and a function of executing data migration between the real volumes 1050 and between the virtual volumes 1051.

The real volumes 1050 and the virtual pool volumes 1052 may be the storage medium of a single hard disk 1070 itself. Alternatively, the real volumes 1050 and the virtual pool volumes 1052 may be logical volumes implemented by a RAID configuration including a plurality of hard disks 1070. Another option is to employ volumes of an externally coupled storage system (not shown) as the real volumes 1050 and the virtual pool volumes 1052. The hard disks 1070 may be replaced with flash memories or other similar storage media.

Figure 3:
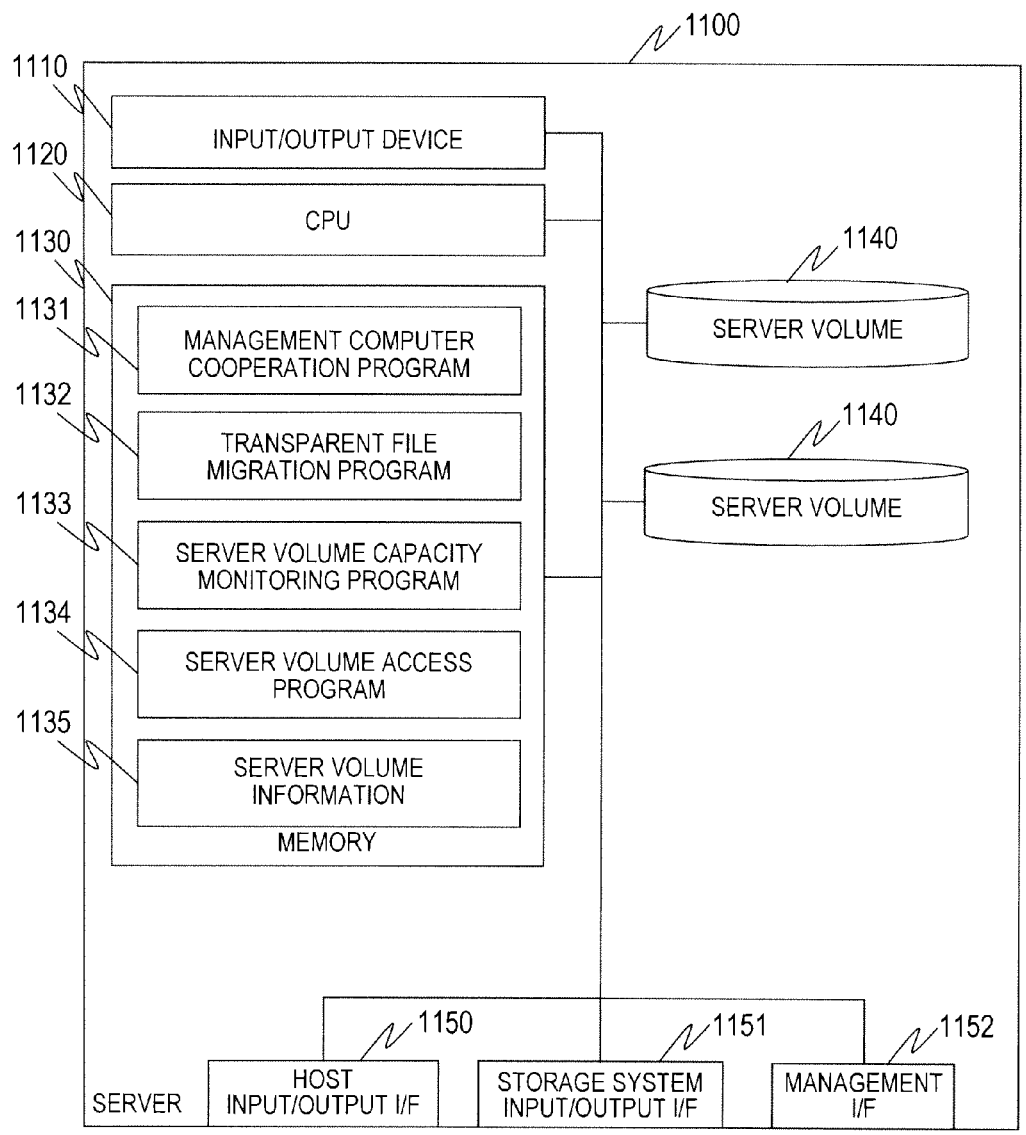
FIG. 3 is an example of a block diagram showing a configuration of a server as a component of the computer system according to the first embodiment of this invention.

FIG. 3 is an example of a block diagram showing a configuration of the server 1100 as a component of the computer system according to the first embodiment of this invention.

The server 1100 is a computer that has an input/output device 1110, a CPU 1120, a memory 1130, server volumes 1140, a host input/output I/F 1150, a storage system input/output I/F 1151, and a management I/F 1152.

The host input/output I/F 1150 is coupled to the second network 1500 to send and receive data I/O relevant to read and write of the host 1200.

The storage system input/output I/F 1151 is coupled to the first network 1400 to send and receive data I/O relevant to read and write of the storage system 1000.

The management I/F 1152 is coupled to the management network 1600 to execute communications relevant to operation requests made by the management computer 1300.

The CPU 1120 is a processor that executes programs stored in the memory 1130.

The memory 1130 stores a management computer cooperation program 1131, a transparent file migration program 1132, a server volume capacity monitoring program 1133, a server volume access program 1134, and server volume information 1135.

The management computer cooperation program 1131 is a program that receives operation requests from the management computer 1300 over the management computer 1300 and the management network 1600 and sends results of processing the requests.

The transparent file migration program 1132 is a program that makes a file migrate to another file system without any configuration changes in the host 1200. The transparent file migration function is implemented by, for example, a file virtualization function with which a plurality of file systems and the server volumes 1140 can be managed as a single name space.

The server volume capacity monitoring program 1133 is a program that monitors capacities of the server volumes 1140 and a capacity actually used by the server 1100.

The server volume access program 1134 is a program that controls the input/output operation to and from the host 1200 and the storage system 1000, and that manages capacity among others. The server volume access program 1134 has actual file system functions.

The server volume information 1135 is configuration information of the server volumes 1140. The server volume information 1135 in this embodiment is used by the transparent file migration program 1132 and the server volume capacity monitoring program 1133.

The server volumes 1140 are logical volumes managed on the server 1100. Specifically, the server volumes 1140 are set such that the server 1100 can use and recognize the real volumes 1050 or the virtual volumes 1051 of the storage system 1000 as the server volumes 1140. In other words, data I/O to and from one server volume 1140 that the server 1100 executes is actually data I/O to and from the virtual volume 1051 or the real volume 1050 that is associated with this server volume 1140.

The server 1100 may use a logical volume manager (LVM) or the like to reset the server volumes 1140 as logical volumes.

Figure 4:
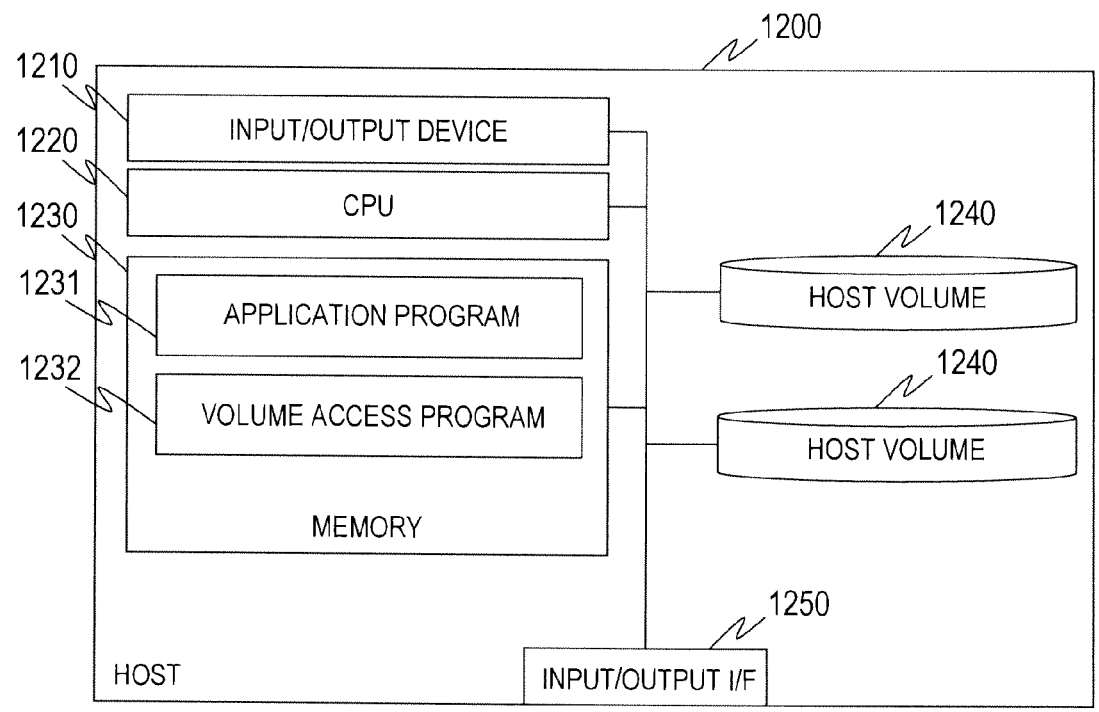
FIG. 4 is an example of a block diagram showing a configuration of each host as a component of the computer system according to the first embodiment of this invention.

FIG. 4 is an example of a block diagram showing a configuration of each host 1200 as a component of the computer system according to the first embodiment of this invention.

The host 1200 is a computer that has an input/output device 1210, a CPU 1220, a memory 1230, host volumes 1240, and an input/output I/F 1250.

The input/output I/F 1250 executes communications relevant to input to and output from the server 1100.

The CPU 1220 is a processor that executes programs stored in the memory 1230.

The memory 1230 stores a business operation (application) program 1231, which is run on the host 1200, and a volume access program 1232, which controls volume access to the server 1100. The volume access program 1232 in this embodiment creates an environment that enables the host 1200 to communicate with the server 1100 through a network file system.

The host volumes 1240 are volumes set such that the host 1200 can use volumes managed by the server 1100 (i.e., the server volumes 1140). As the host volumes 1240, the server volumes 1140 may be mounted by the network file system without any changes, or logical volumes created by the LVM by resetting other server volumes may be mounted.

Figure 5:
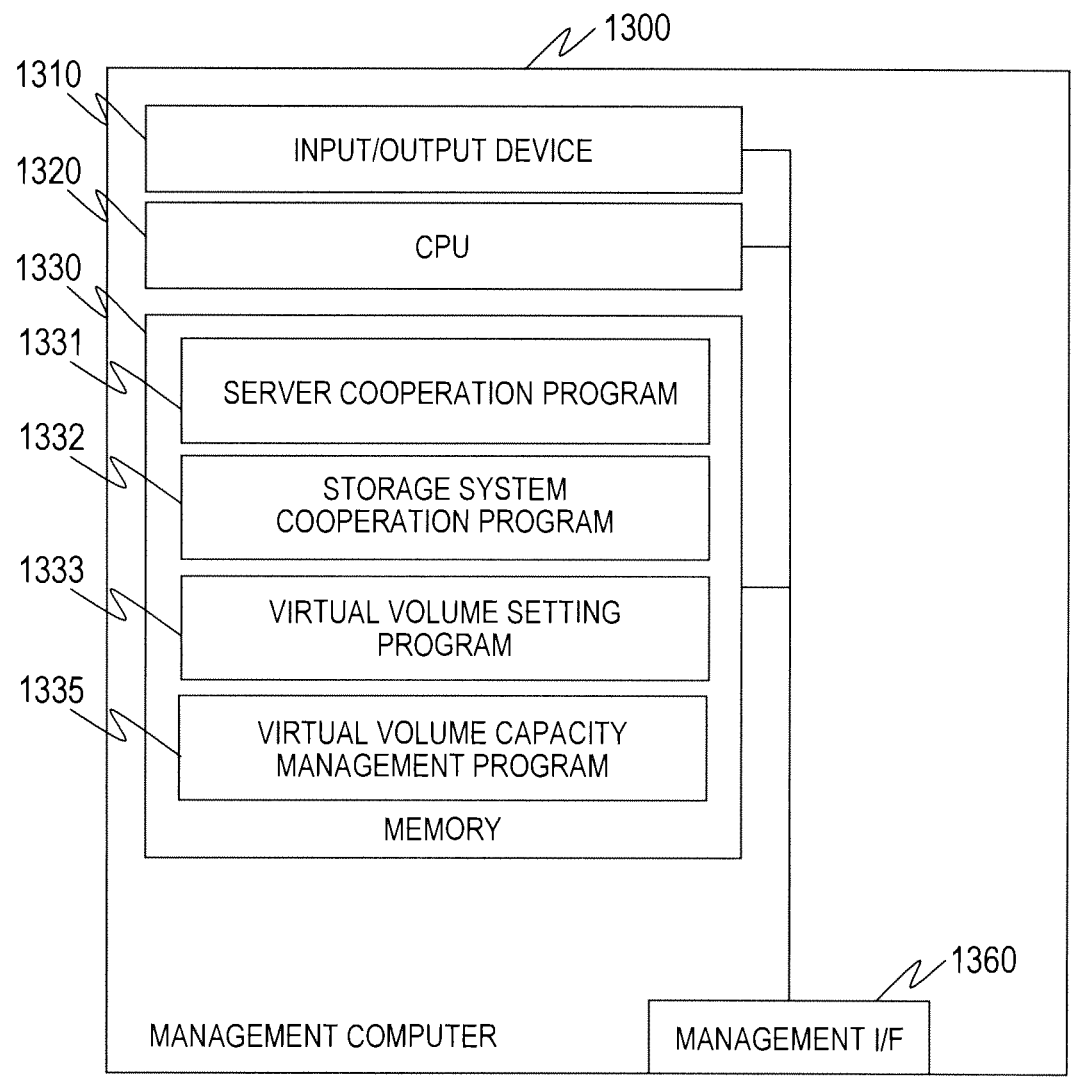
FIG. 5 is an example of a block diagram showing a configuration of a management computer as a component of the computer system according to the first embodiment of this invention.

FIG. 5 is an example of a block diagram showing a configuration of the management computer 1300 as a component of the computer system according to the first embodiment of this invention.

The management computer 1300 is a computer that has an input/output device 1310, a CPU 1320, a memory 1330, and a management I/F 1360.

The management I/F 1360 is coupled to the management network 1600 to communicate with the storage system 1000 and the server 1100.

The CPU 1320 is a processor that executes programs stored in the memory 1330.

The memory 1330 stores a server cooperation program 1331, a storage system cooperation program 1332, a virtual volume setting program 1333, a virtual volume capacity management program 1335, and storage system management information 1340.

The server cooperation program 1331, the storage system cooperation program 1332, the virtual volume setting program 1333, and the virtual volume capacity management program 1335 implement processing of embodiments of this invention.

Processing described in the following description as being executed by the server cooperation program 1331, the storage system cooperation program 1332, the virtual volume setting program 1333, or the virtual volume capacity management program 1335 is actually executed by the CPU 1320 which runs the program.

FIGS. 6, 7, 8, 9, and 10 show an example of information included in the storage system configuration information 1042 of the storage system 1000.

In the following description, the unit of capacity is byte (B) unless otherwise noted. For example, "virtual capacity: 10 G" written in a table means that this capacity is 10 G bytes.

Figure 6:
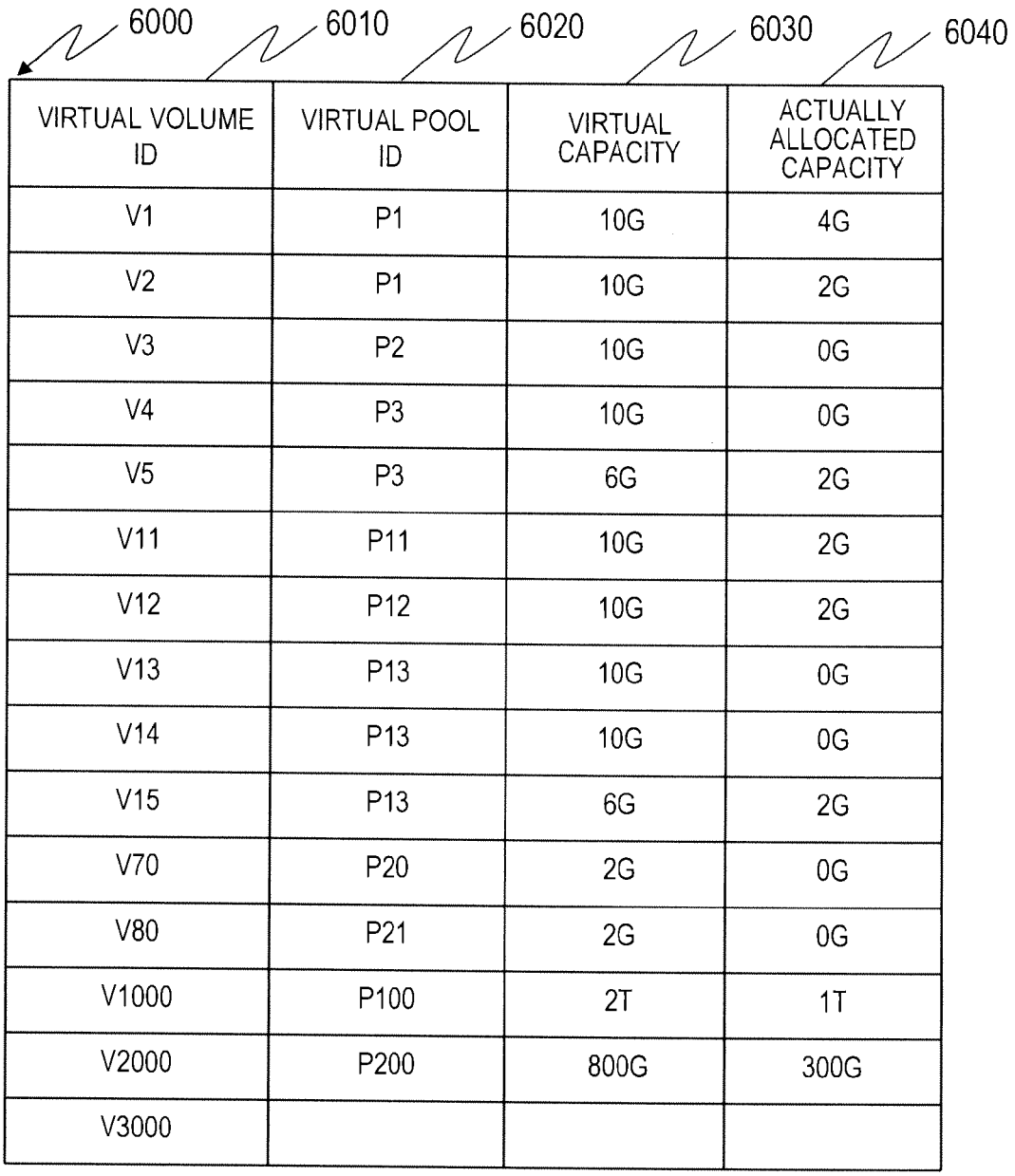
FIG. 6 is an explanatory diagram showing an example of a table for managing virtual volume information that is included in a storage system configuration information of the storage system according to the first embodiment of this invention.

FIG. 6 is an explanatory diagram showing an example of a table for managing virtual volume information that is included in the storage system configuration information 1042 of the storage system 1000 according to the first embodiment of this invention.

A virtual volume table 6000 is constituted of entries each holding a virtual volume ID 6010, a virtual pool ID 6020, a virtual capacity 6030, and an actually allocated capacity 6040.

The virtual volume ID 6010 indicates the identifier (ID) of each virtual volume 1051. The virtual pool ID 6020 indicates the identifier of the virtual pool 1060 that is used as the actual (i.e., physical) storage area of the virtual volume 1051. The virtual capacity 6030 indicates the capacity of the virtual volume 1051 that is recognized by the server 1100. The actually allocated capacity 6040 indicates the capacity of the physical storage area that is actually allocated to the virtual volume 1051.

The capacity actually allocated to one virtual volume 1051 increases as more data is written by the server 1100 and other computers as described above. Information such as a combination of a logical unit number (LUN) assigned to each virtual volume 1051 and the port ID of a SCSI is sometimes used to make the virtual volume 1051 recognizable to the server 1100. In this case, the LUN and the port ID may be managed in the virtual volume table 6000.

Figure 7:
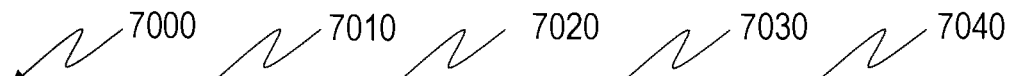
FIG. 7 is an explanatory diagram showing an example of a table for managing virtual pool capacity information that is included in the storage system configuration information of the storage system according to the first embodiment of this invention.

FIG. 7 is an explanatory diagram showing an example of a table for managing virtual pool capacity information that is included in the storage system configuration information 1042 of the storage system 1000 according to the first embodiment of this invention.

A virtual pool capacity table 7000 is constituted of entries each holding a virtual pool ID 7010, a total capacity 7020, an allocated capacity 7030, and a threshold 7040.

The virtual pool ID 7010 indicates the identifier of each virtual pool 1060. The total capacity 7020 indicates the total capacity of the virtual pool 1060. The allocated capacity 7030 indicates a total capacity that is already allocated from the virtual pool 1060 to the virtual volumes 1051. The threshold 7040 indicates a threshold for the allocated capacity 7030.

Set as the threshold 7040 is a threshold (in percentage) for the ratio of the allocated capacity 7030 with respect to the virtual capacity 6030. When the allocated capacity/virtual capacity ratio exceeds the threshold 7040, it may be judged that the virtual pool 1060 needs an additional capacity. Alternatively, when the allocated capacity/virtual capacity ratio exceeds the threshold 7040, the storage system 1000 may stop newly adding a capacity to the virtual volumes 1051. The threshold 7040 may be specified by a user or may automatically be determined by the storage system configuration program 1041 based on the virtual pool capacity. The threshold 7040 may be expressed in capacity instead of percentage.

Figure 8:
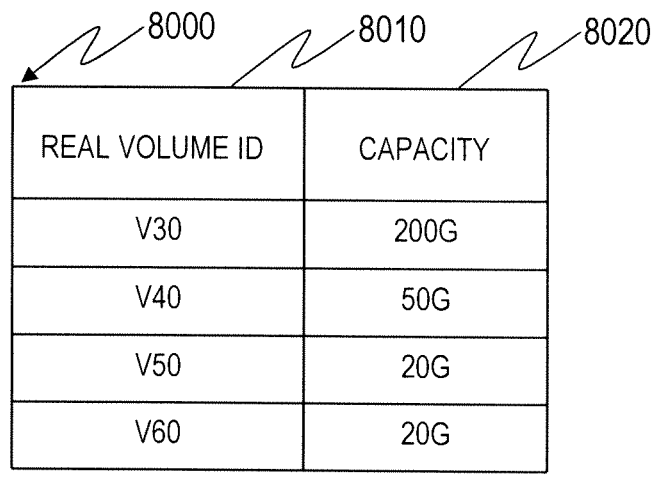
FIG. 8 is an explanatory diagram showing an example of a table for managing real volume information that is included in the storage system configuration information of the storage system according to the first embodiment of this invention.

FIG. 8 is an explanatory diagram showing an example of a table for managing real volume information that is included in the storage system configuration information 1042 of the storage system 1000 according to the first embodiment of this invention.

A real volume table 8000 is constituted of entries each holding a real volume ID 8010 and a capacity 8020. The real volume table 8000 is a table used to check the capacity of each real volume 1050. Specifically, the real volume ID 8010 indicates the identifier of each real volume 1050. The capacity 8020 indicates the capacity of the real volume 1050.

To simplify the explanation, it is assumed here that the real volumes 1050 registered in this table can be changed into the virtual pool volumes 1052. In other words, a real volume can be managed as a virtual pool volume by adding the real volume to a virtual pool.

FIG. 9 is an explanatory diagram showing an example of a table for managing an allocation state of each virtual pool 1060 that is included in the storage system configuration information 1042 of the storage system 1000 according to the first embodiment of this invention.

A virtual pool table 9000 is constituted of entries each holding a virtual pool ID 9010, a virtual pool volume ID 9020, an allocated LBA 9040, a chunk ID 9030, and an allocation state 9050.

The virtual pool ID 9010 indicates the identifier of each virtual pool 1060. The virtual pool volume ID 9020 indicates the identifier of the virtual pool volume 1052 that belongs to the virtual pool 1060 identified by the virtual pool ID 9010. A logical block address (LBA) at which a storage area to be provided to the virtual pool 1060 by the virtual pool volume 1052 that is identified by the virtual pool volume ID 9020 is already allocated is registered as the allocated LBA 9040. The chunk ID 9030 indicates the identifier of an allocated storage area (chunk) that belongs to the virtual pool 1060 identified by the virtual pool ID 9010, out of chunks that are indicated by the allocated LBA 9040. The allocation state 9050 indicates the allocation state of the chunk identified by the chunk ID 9030.

As the allocation state 9050, a value indicating an allocation state, one of "allocated" and "unallocated", is registered. The value "allocated" indicates that the chunk is allocated to one of the virtual volumes 1051, and "unallocated" indicates that the chunk is not allocated to any of the virtual volumes 1051. When a chunk is allocated, the ID of the virtual volume 1051 to which the chunk is allocated is also registered as the allocation state 9050.

For example, an entry at the top of the table of FIG. 9 shows that a chunk having a chunk ID "C11" is constituted of a 2-GB physical storage area whose start address is 0 GB from the head of the virtual pool volume 1052 having a virtual pool volume ID "V100" in the virtual pool 1060 having a virtual pool ID "P1" and whose end address is 2 GB from the head of this virtual pool volume 1052, and that the chunk "C11" is already allocated to a virtual volume "V1" (the virtual volume 1051 that is identified by an identifier "V1").

The total capacity 7020 of the virtual pool capacity table 7000 shows the combined capacities of all chunks in each virtual pool 1060, and the allocated capacity 7030 shows the total chunk capacity allocated from the virtual pool 1060.

Numerically larger identifiers such as "P100" are omitted from the example shown in FIG. 9, but the virtual pools 1060 that are identified by those identifiers are also managed with this table in the same manner.

FIG. 10 is an explanatory diagram showing an example of a table for managing an allocation state of each virtual volume 1051 that is included in the storage system configuration information 1042 of the storage system 1000 according to the first embodiment of this invention.

A virtual volume allocation table 10000 is constituted of entries each holding a virtual volume ID 10010, a virtual pool ID 10020, an allocated LBA 10040, and a chunk ID 10030.

The virtual volume ID 10010 indicates the identifier of each virtual volume 1051. The virtual pool ID 10020 indicates the identifier of the virtual pool 1060 that is used by the virtual volume 1051 to store data. The allocated LBA 10040 indicates an LBA at which a physical storage area (chunk) is already actually allocated to part of a storage area space to be provided by the virtual volume 1051 to the server 1100. The chunk ID 10030 indicates the identifier of a chunk that is associated with an LBA indicated by the allocated LBA 10040 (namely, a chunk allocated to a storage area of the virtual volume 1051 that is indicated by this LBA).

For example, the fourth entry from the top of FIG. 10 shows that a chunk "C13" is already allocated to a 2-GB storage area whose start address is 2 GB from the head of the storage area space of the virtual volume 1051 having a virtual volume ID "V2" and whose end address is 4 GB from the head of this storage area space.

Numerically larger identifiers such as "V1000", "V2000", and "V3000" are omitted from the example shown in FIG. 10, but the virtual volumes 1051 that are identified by those identifiers are also managed with this table in the same manner.

FIG. 11 is an explanatory diagram showing an example of the server volume information 1135 of the server 1100 according to the first embodiment of this invention.

A server volume table 11000 is constituted of entries each holding a server volume 11010, a capacity 11020, a used capacity 11030, and a file 11040.

The server volume 11010 indicates the identifier of each server volume 1140 used by the server 1100. Specifically, the server volume 11010 indicates the same ID as the one assigned to each real volume 1050 or each virtual volume 1051 of the storage system 1000 (e.g., the virtual volume ID 6010).

The capacity 11020 indicates the capacity of the server volume 1140. When the server volume 1140 is associated with one of the virtual volumes 1051, the capacity 11020 indicates the virtual capacity (e.g., the virtual capacity 6030) of this virtual volume 1051.

The used capacity 11030 indicates how much of the capacity of the server volume 1140 is used by the server 1100 to store files. The file 11040 indicates the identifier of a file that is stored in the server volume 1140.

For example, an entry at the top of FIG. 11 shows that a server volume "V1000" is the virtual volume 1051 that is identified by an identifier "V 1000" in the storage system 1000, and that the capacity 11020 of the server volume "V1000" is the virtual capacity 6030 of this virtual volume 1051, "2 T". This entry also shows that the server volume "V1000" stores files "F1", "F2", "F3", and "F4", and that the used capacity 11030 for storing those files is "200 G".

Described above is how the IDs of the virtual volumes 1051, the IDs of the virtual pools 1060, the IDs of the virtual pool volumes 1052, and the IDs of the real volumes 1050 are handled in the tables of FIGS. 5, 6, 7, 8, 9, 10, and 11. Information in those tables is referred to by the management computer 1300 in cases described below. To simplify the explanation, the first embodiment employs an example in which the management computer 1300 manages only one storage system 1000.

In the case where the management computer 1300 manages a plurality of storage systems 1000, the above-mentioned IDs remain unique within each of the storage systems 1000 but are not guaranteed to be unique throughout the entire computer system. Then, the management computer 1300 obtains the identifiers of the respective storage systems 1000 and combines the obtained identifiers with virtual volume IDs or virtual pool IDs to identify each of the volumes or pools of the plurality of storage systems 1000 uniquely throughout the computer system. This invention is thus made applicable to management of a computer system that has a plurality of storage systems 1000 as well.

The first embodiment further simplifies the explanation by employing an example in which the computer system has only one server 1100. To apply this invention to a computer system that has a plurality of servers 1100, it only needs to make all of the servers 1100 obtain the information of FIG. 11. In the case where the servers 1100 exchange data with the management computer 1300, volumes used by the servers 1100 may be sent to the management computer 1300 in advance. Then, the management computer 1300 manages information obtained from each server 1100 which includes information registered as the server volume 11010 in the server volume table 11000 and information for identifying the server 1100. The rest of the information in the server volume table 11000 may also be managed by the management computer 1300.

Figure 12:
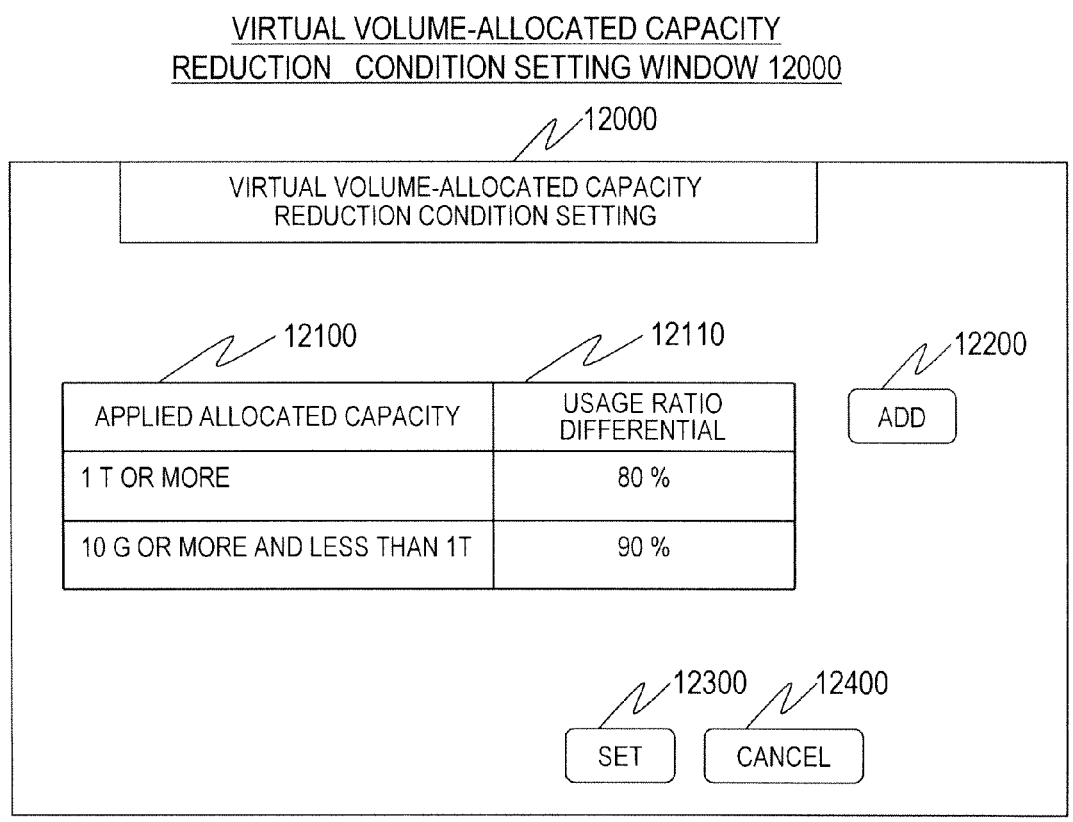
FIG. 12 is an explanatory diagram showing an example of a window for setting a condition for reducing a virtual volume-allocated capacity according to the first embodiment of this invention.

FIG. 12 is an explanatory diagram showing an example of a window for setting a condition for reducing a virtual volume-allocated capacity according to the first embodiment of this invention.

The window shown in FIG. 12 is for setting the same condition to all virtual volumes 1051, and does not include a field for specifying a volume. A window for setting a condition to a specified volume will be described later with reference to FIG. 13. However, as will be described later, the window for setting a condition to a specified volume is in some cases called up from FIG. 12 and, in that case, the following information is applied to the specified volume.

A virtual volume-allocated capacity reduction condition setting window A 12000 includes fields for an applied allocated capacity 12100 and a usage ratio differential 12110.

The virtual volume-allocated capacity reduction condition setting window A 12000 also includes an "add" button 12200, which is operated to add a condition, a "set" button 12300, which is operated to actually apply a condition to the management computer 1300 after the condition is set in the window, and a "cancel" button 12400, which is operated to cancel the setting of this window.

A threshold for the differential between the storage system-allocated capacity and the server-used capacity (usage ratio differential) is set in the field for the usage ratio differential 12110. The usage ratio differential of each virtual volume 1051 is obtained by calculating the difference between a capacity allocated to the virtual volume 1051 (e.g., information registered as the virtual capacity 6030 in the virtual volume table 6000) and a used capacity of the server volume 1140 that is associated with the virtual volume 1051 (e.g., information registered as the used capacity 11030 in the server volume table 11000), then dividing the difference by the allocated capacity of the virtual volume 1051, and then multiplying the result by 100 to express it in percentage.

In other words, the usage ratio differential corresponds to the ratio of the unused capacity to the allocated capacity. As the value of the usage ratio differential becomes larger, the capacity unnecessarily allocated to the virtual volume 1051 increases. The usage ratio differential 12110 is a threshold for the thus defined usage ratio differential and, when the usage ratio differential of the virtual volume 1051 exceeds the value of the usage ratio differential 12110, allocated capacity reduction processing of FIGS. 15 to 18 is executed.

A virtual volume-allocated capacity to which the value of the usage ratio differential 12110 is applied is set in the field for the applied allocated capacity 12100.

In the example of FIG. 12, "80%" is set as the usage ratio differential 12110 for a value "1 T or more" of the applied allocated capacity 12100. This means that, when a usage ratio differential calculated about one virtual volume 1051 to which a capacity of 1 T bytes or larger is allocated and the server volume 1140 that is associated with this virtual volume 1051 is 80% or higher, allocated capacity reduction processing is executed. For a value "10 G or more and less than 1 T" of the applied allocated capacity 12100, "90%" is set as the usage ratio differential 12110. This means that allocated capacity reduction processing is executed when a usage ratio differential calculated about one virtual volume 1051 to which a capacity of 10 G bytes or larger and smaller than 1 T bytes is allocated and the server volume 1140 that is associated with this virtual volume 1051 is 90% or higher.

Specifically, in the case where "80%" is set as the usage ratio differential 12110 and a capacity allocated to one virtual volume is 1 T as in the example of FIG. 12, allocated capacity reduction processing is executed when a used capacity of its associated server volume reaches 200 G. Steps of the allocated capacity reduction processing will be described later with reference to FIGS. 15 to 18.

Figure 13:
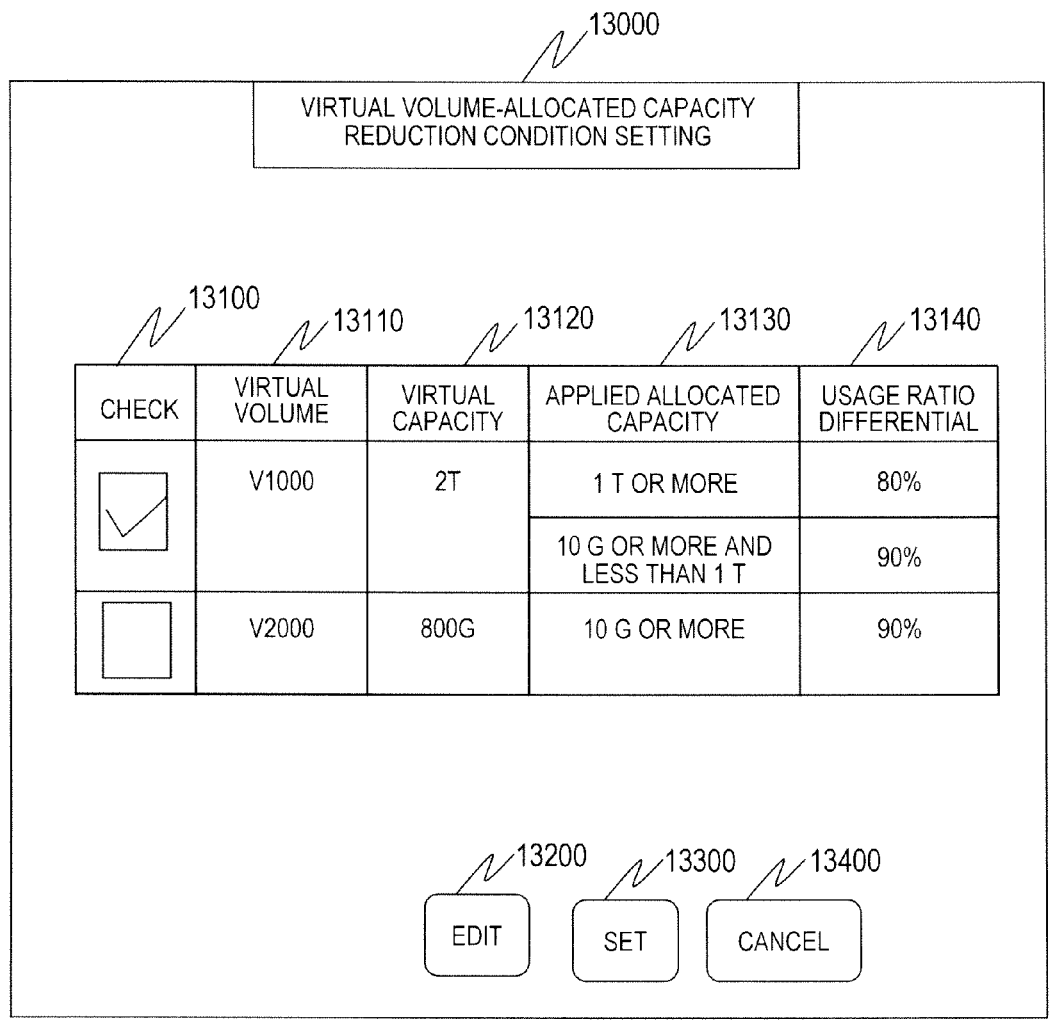
FIG. 13 is an explanatory diagram showing another example of the window for setting a condition for reducing a virtual volume-allocated capacity according to the first embodiment of this invention.

FIG. 13 is an explanatory diagram showing another example of the window for setting a condition for reducing a virtual volume-allocated capacity according to the first embodiment of this invention.

Specifically, FIG. 13 shows an example of a window for setting a condition for each virtual volume 1051 separately.

A virtual volume-allocated capacity reduction condition setting window B 13000 is a window for displaying, editing, and setting an allocated capacity reduction condition of each virtual volume 1051, and includes fields for a check 13100, a virtual volume 13110, a virtual capacity 13120, an applied allocated capacity 13130, and a usage ratio differential 13140.

The virtual volume-allocated capacity reduction condition setting window B 13000 also includes an "edit" button 13200, which is operated to edit a condition of a check-marked volume, a "set" button 13300, which is operated to actually apply a condition to the management computer 1300 after the condition is set in the window, and a "cancel" button 13400, which is operated to cancel the setting of this window.

The check 13100 is a check flag for specifying the virtual volume 1051 whose allocated capacity reduction condition is to be edited. The virtual volume 13110 indicates the ID of each virtual volume 1051. The virtual capacity 13120 indicates the virtual capacity of the virtual volume 1051 that is identified by the virtual volume 13110.

The applied allocated capacity 13130 and the usage ratio differential 13140 are used the same way as the applied allocated capacity 12100 and the usage ratio differential 12110 of FIG. 12, respectively. In the case where the window of FIG. 12 and the window of FIG. 13 are used together, values set in FIG. 12 may automatically be reflected in FIG. 13. For example, for the virtual volume "V1000" whose virtual capacity is 2 T, two conditions shown in FIG. 12, "1 T or more" and "10 G or more and less than 1 T", are displayed in FIG. 13 without changes.

When the user operates the edit button 13200, the window of FIG. 12 is displayed and the user sets conditions in terms of the applied allocated capacity and the usage ratio differential through the window of FIG. 12.

Alternatively, the editing processing may not include calling up the window of FIG. 12. In this case, the values of the applied allocated capacity 13130 and the usage ratio differential 13140 may be kept as default values, or blank cells may be displayed to be filled through editing by the user.

The window of FIG. 13 may also be called up when a virtual volume is set, or at a suitable time after the virtual volume is set. In the case where the window of FIG. 13 is called up when a virtual volume is set, the window may display only the volume to be set.

Figure 14:
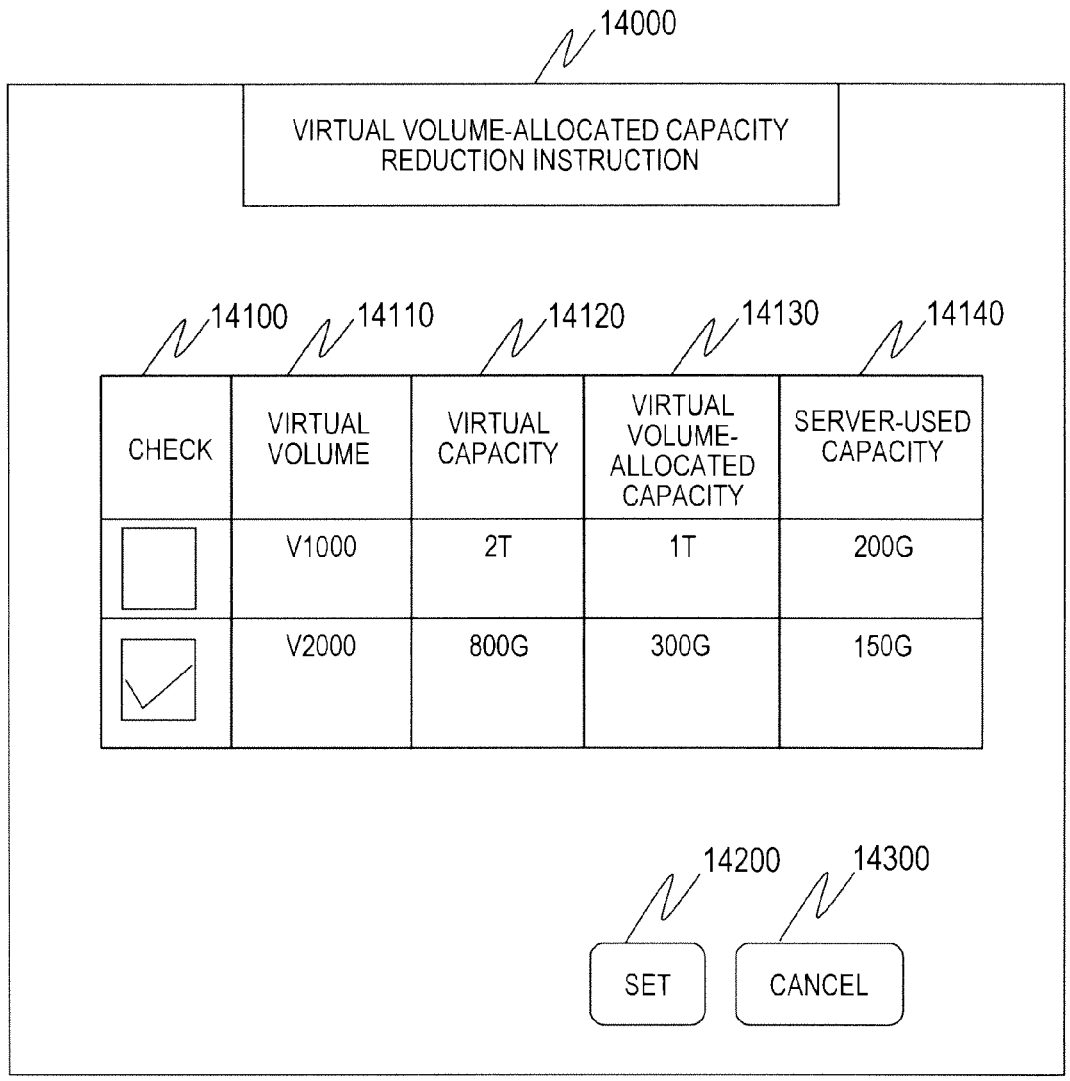
FIG. 14 is an explanatory diagram showing an example of a window for instructing a virtual volume-allocated capacity reduction according to the first embodiment of this invention.

FIG. 14 is an explanatory diagram showing an example of a window for instructing a virtual volume-allocated capacity reduction according to the first embodiment of this invention.

A virtual volume-allocated capacity reduction instruction window 14000 includes fields for a check 14100, a virtual volume 14110, a virtual capacity 14120, a virtual volume-allocated capacity 14130, and a server-used capacity 14140.

The check 14100 is a check flag for specifying a volume whose allocated capacity is instructed to be reduced. The virtual volume 14110 indicates the ID of each virtual volume 1051. The virtual capacity 14120 indicates the virtual capacity of the virtual volume 1051 identified by the virtual volume 14110. The virtual volume-allocated capacity 14130 indicates a capacity allocated to the virtual volume 1051. The server-used capacity 14140 indicates how much capacity of the virtual volume 1051 is used by the server 1100 (in other words, the used capacity of the server volume 1140 that is associated with the virtual volume 1051).

Other components of the virtual volume-allocated capacity reduction instruction window 14000 are a "set" button 14200, which is operated to actually give an allocated capacity reduction instruction to a check-marked volume, and a "cancel" button 14300, which is operated to cancel the setting of this window.

The virtual capacities and the virtual volume-allocated capacities of the respective virtual volumes 1051 can be obtained from information in the virtual volume table 6000 of the storage system 1000, and the server-used capacities of the respective virtual volumes 1051 can be obtained from the server volume table 11000 of the server 1100. Therefore, in displaying the window of FIG. 14, Steps 15030 and 15040 of FIG. 15 described later can be used to obtain the information on the virtual volumes 1051.

When the set button 14200 is operated with one of the checkboxes of the check 14100 checked, virtual volume-allocated capacity reduction processing is executed. This processing will be described later with reference to FIGS. 15 to 18.

Operations using the window of FIG. 14 are executed independently of operations using the window of FIG. 12 and those using the window of FIG. 13. Accordingly, settings in the window of FIG. 12 or FIG. 13 may be irrelevant to settings in the window of FIG. 14, or the window of FIG. 12 or FIG. 13 may not be set at all. FIG. 14 is about settings for virtual volume-allocated capacity reduction that is executed manually by the user whereas FIGS. 12 and 13 are about settings for virtual volume-allocated capacity reduction that is executed automatically based on a threshold.

Next, processing executed in this embodiment will be described.

First, processing executed by the storage system 1000 upon reception of a request to write in one of the virtual volumes 1051 will be described.

In the case where a write request to one virtual volume 1051 has never been executed, no physical storage area (chunk) of any virtual pool 1060 has been allocated to this virtual volume 1051. However, there can be an exception for a valid reason, and a storage area may be allocated in advance to part of one virtual volume 1051 which is defined by a start address and an end address (address range).

The controller 1020 receives a write request that specifies an address range in one virtual volume 1051. The controller 1020 checks whether or not a chunk from any virtual pool 1060 has been allocated to the specified address range. In the case where a chunk has been allocated, the controller 1020 stores requested data in the allocated chunk.

In the case where no chunk has been allocated to the specified address range, the controller 1020 allocates a chunk that has not been allocated to an address range of any virtual volume 1051 to the specified address range, and stores requested data in the allocated chunk. The controller 1020 then makes the new allocation reflected on management information (e.g., the virtual pool table 9000).

Described next is processing that is executed by the storage system 1000 upon reception of a request to read out of one of the virtual volumes 1051.

The controller 1020 receives a read request that specifies an address range in one virtual volume 1051. The controller 1020 checks whether or not a chunk from any virtual pool 1060 has been allocated to the specified address range. In the case where a chunk has been allocated, the controller 1020 reads data out of the allocated chunk and sends the read data to the server 1100 in response.

In the case where no chunk has been allocated to the specified address range, the controller 1020 sends predetermined data (for example, "0") which has a data amount equal to that of the specified address range to the server 1100 in response.

Next, virtual volume-allocated capacity reduction processing according to this embodiment will be described.

FIGS. 15, 16, 17, and 18 show an example of a flow chart for the virtual volume-allocated capacity reduction processing.

In FIGS. 15, 16, 17, and 18, the management computer 1300 runs the programs in the memory 1330 using the CPU 1320. The description of FIGS. 15 to 18, however, also touches upon operations that the storage system 1000 and the server 1100 perform following the flow chart, as the management computer 1300 works in cooperation with the storage system 1000 and the server 1100.

Figure 15:
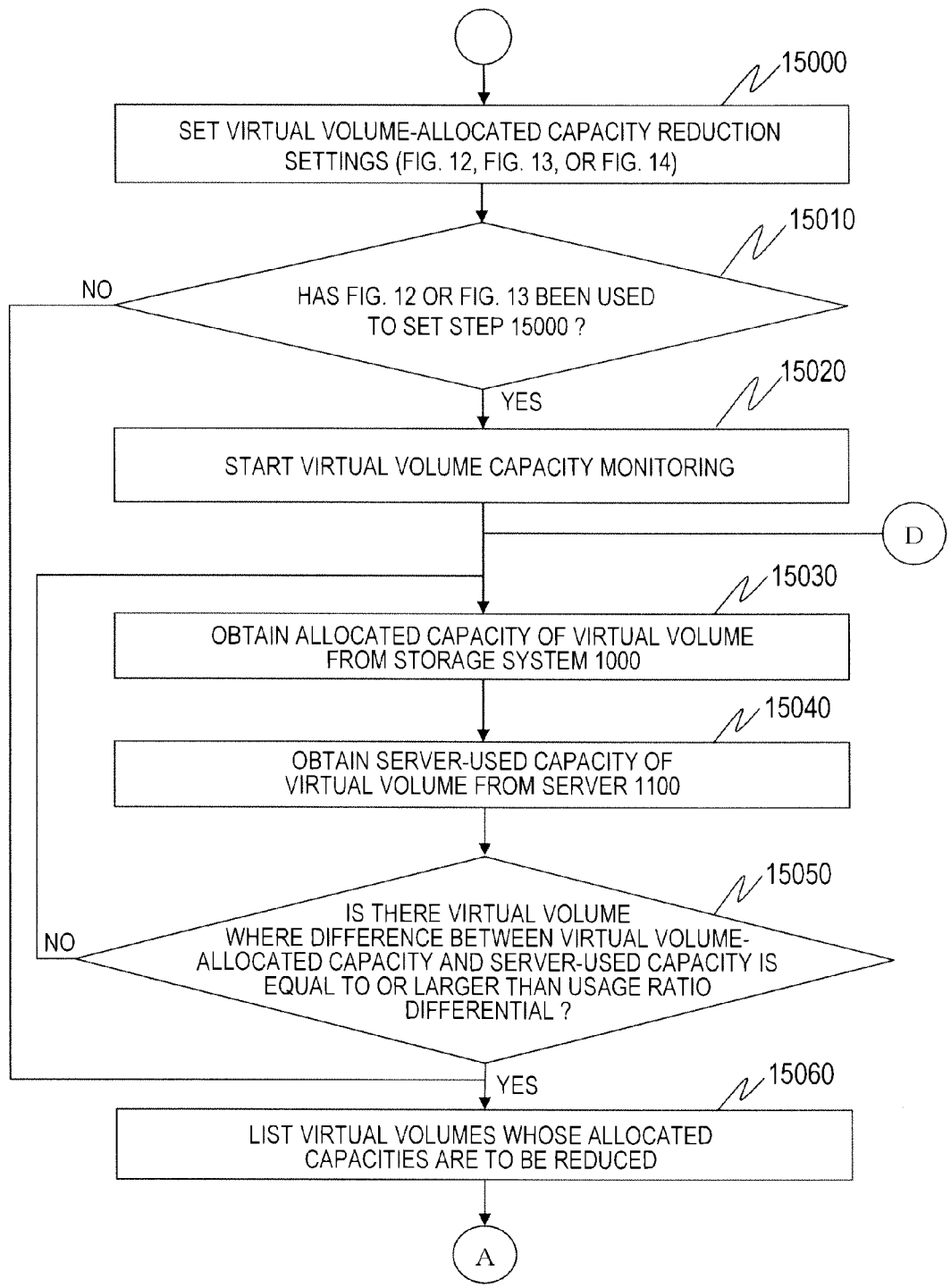
FIG. 15 is an example of a flow chart showing processing of selecting which one of the virtual volumes is to be reduced in allocated capacity according to the first embodiment of this invention.

FIG. 15 is an example of a flow chart showing processing of selecting which one of the virtual volumes 1051 is to be reduced in allocated capacity according to the first embodiment of this invention.

The management computer 1300 receives virtual volume-allocated capacity reduction settings from the user by way of the virtual volume capacity management program 1335 (Step 15000). The management computer 1300 uses, for example, the above-mentioned window of FIG. 12, 13, or 14 to receive virtual volume-allocated capacity reduction settings. The command line format, the file format, or the like may be used instead of the above-mentioned window to set virtual volume-allocated capacity reduction settings.

After Step 15000 is finished, the processing proceeds to Step 15010.

The management computer 1300 runs the virtual volume capacity management program 1335 to judge whether or not the window of FIG. 12 or 13 has been used to set the settings of Step 15000 (Step 15010). In the case where the window of FIG. 12 or 13 has been used to set the settings of Step 15000, an automatic virtual volume-allocated capacity reduction based on a threshold is executed. The processing accordingly proceeds to Step 15020. In the case where the window of FIG. 12 or 13 has not been used to set the settings of Step 15000 (in other words, the window of FIG. 14 has been used), the user manually reduces the virtual volume-allocated capacity. The processing accordingly proceeds to Step 15060.

The management computer 1300 starts monitoring the capacities of the virtual volumes 1051 through the virtual volume capacity management program 1335 (Step 15020). The processing then proceeds to Step 15030.

The management computer 1300 uses the virtual volume capacity management program 1335, which in turn uses the storage system cooperation program 1332, to obtain from the storage system 1000 a capacity that is allocated to the virtual volume 1051 specified in the window of FIG. 12 or 13 (Step 15030). In short, information in the virtual volume table 6000 is obtained from the storage system 1000.

After Step 15030 is finished, the processing proceeds to Step 15040.

The management computer 1300 uses the virtual volume capacity management program 1335, which in turn uses the server cooperation program 1331, to obtain from the server 1100 how much capacity of the virtual volume 1051 specified in FIG. 12 or 13 is used by the server 1100 (Step 15040). In short, information in the server volume table 11000 is obtained from the server 1100.

Receiving a request for the above-mentioned information through the management computer cooperation program 1131, the server 1100 uses the server volume capacity monitoring program 1133 to obtain information in the server volume table 11000, which is part of the server volume information 1135, and uses the management computer cooperation program 1131 to send the obtained information in the server volume table 11000 to the management computer 1300. The information sent from the server 1100 to the management computer 1300 may be information solely about the volume specified in the window of FIG. 12 or 13, or may be the whole information managed by the server 1100. In the latter case, the management computer 1300 picks out information about the specified volume from the sent information.

After Step 15040 is finished, the processing proceeds to Step 15050.

The management computer 1300 uses the virtual volume capacity management program 1335 to judge whether or not there is any virtual volume 1051 whose usage ratio differential calculated from the allocated capacity and the server-used capacity is equal to or larger than the usage ratio differential 12110 (or 13140) (Step 15050).

In the case where the virtual volume 1051 that meets the judging criterion of Step 15050 (the virtual volume 1051 whose calculated usage ratio differential is equal to or larger than the usage ratio differential 12110 or 13140) is found, it means that this virtual volume 1051 is already allocated a large capacity that is not being used. The virtual volume 1051 that meets the judging criterion is therefore treated as a subject of the virtual volume-allocated capacity reduction processing, and the processing proceeds to Step 15060. In the case where no virtual volume 1051 meets the above-mentioned judging criterion, the processing returns to Step 15030.

In the case where the processing returns to Step 15030, the processing may be suspended for a given period of time to resume from Step 15030 after the given period of time passes. This is because, if the interval is short between the execution of Step 15050 this time and the next execution of Step 15050, it is likely that the situation is not changed during the interval and that the processing returns to Step 15030 again as a result of the next execution of Step 15050.

In Steps 15030 and 15040, the management computer 1300 may obtain the information by issuing a given command or the like, or the storage system 1000 and the server 1100 may supply the information to the management computer 1300 regularly or upon change in capacity.

For instance, when a virtual volume identified by an identifier "V1000" (hereinafter referred to as virtual volume "V1000") is set up in the manner shown in the example of the virtual volume table 6000 and the virtual volume "V1000" is set up (as its associated server volume "V1000") in the manner shown in the example of the server volume table 11000, the virtual capacity, actually allocated capacity, and server-used capacity of the virtual volume "V1000" are 2 T, 1 T, and 200 G, respectively. According to the settings example of FIG. 12, the usage ratio differential 12110 is 80% for an allocated capacity of 1 T or larger. A usage ratio differential calculated from the above-mentioned information on the virtual volume "V1000" is 80%. Then, the virtual volume "V1000" is judged in Step 15050 as the virtual volume 1051 that meets the judging criterion, and the processing proceeds to Step 15060.

For a virtual volume "V2000", a usage ratio differential calculated in a similar manner is 50%, and the processing proceeds to Step 15030.

The management computer 1300 uses the virtual volume capacity management program 1335 to list the virtual volumes 1051 judged in Step 15050 as volumes that meet the judging criterion, and designates the listed virtual volumes 1051 as volumes to be reduced in allocated capacity (allocated capacity reduction subjects) (Step 15060).

When it is judged in Step 15010 that the window of FIG. 14 has been used to set the settings, the management computer 1300 designates the virtual volumes 1051 selected by the user in the window of FIG. 14 as allocated capacity reduction subjects in Step 15060.

After Step 15060 is finished, the processing proceeds to Step 16000 (A). Step 16000 and subsequent steps will be described with reference to FIG. 16.

Figure 16:
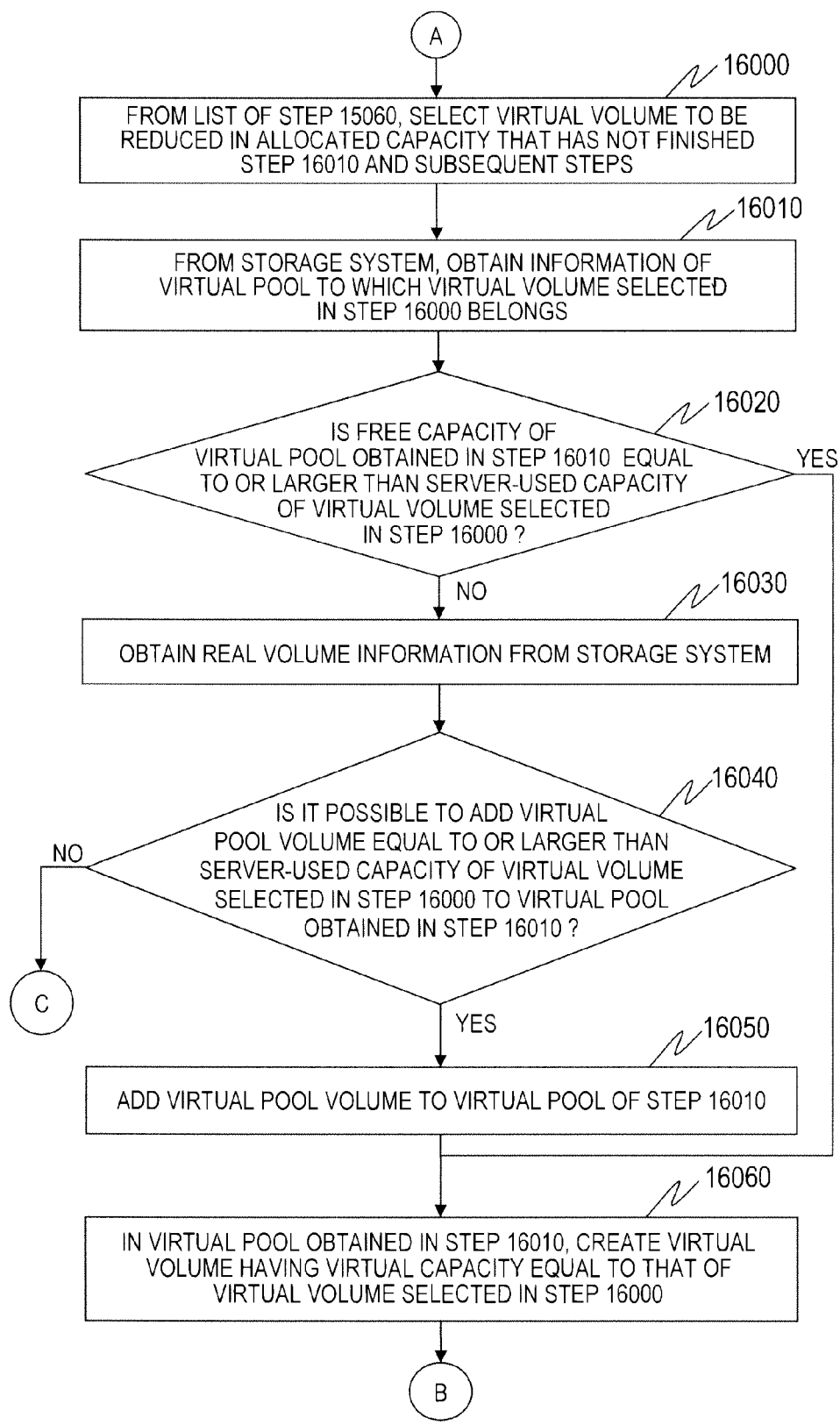
FIG. 16 is an example of a flow chart showing processing of creating a migration destination volume for the virtual volume that is to be reduced in allocated capacity according to the first embodiment of this invention.

FIG. 16 is an example of a flow chart showing processing of creating a migration destination volume for the virtual volume 1051 that is to be reduced in allocated capacity according to the first embodiment of this invention.

The processing shown in FIG. 15 and the processing shown in FIG. 16 are executed successively.

The management computer 1300 uses the virtual volume capacity management program 1335 to select from the list obtained in Step 15060 the virtual volume 1051 to be reduced in allocated capacity that has not finished Step 16010 and subsequent steps (Step 16000).

After Step 16000 is finished, the processing proceeds to Step 16010.

The management computer 1300 uses the virtual volume capacity management program 1335, which in turn uses the storage system cooperation program 1332, to obtain from the storage system 1000 information about the virtual pool 1060 to which the allocated capacity reduction subject virtual volume 1051 selected in Step 16000 belongs (Step 16010). Information on the capacity of this virtual pool 1060 can be retrieved from the already obtained virtual volume table 6000 and virtual pool capacity table 7000.

After Step 16010 is finished, the processing proceeds to Step 16020.

The management computer 1300 uses the virtual volume capacity management program 1335 to judge whether or not the free capacity of the virtual pool 1060 whose information has been obtained in Step 16010 is equal to or larger than the server-used capacity of the virtual volume 1051 to be reduced in allocated capacity (Step 16020). The free capacity of one virtual pool 1060 means part of the total capacity of the virtual pool 1060 that is yet to be allocated to any virtual volume 1051.

Since the server-used capacity of the virtual volume 1051 to be reduced in allocated capacity has already been obtained, the management computer 1300 judges whether or not the free capacity of this virtual pool 1060 is as large as the obtained server-used capacity based on the virtual pool capacity table 7000. When the virtual pool 1060 has a free capacity as large as the server-used capacity, data migration from the virtual volume 1051 to be reduced in allocated capacity is executable.

The step that follows Step 16020 is Step 16060 when data migration from the virtual volume 1051 is judged as executable, and is Step 16030 when data migration from the virtual volume 1051 is judged as inexecutable.

For example, consider a case where the virtual volume 1051 to be reduced in allocated capacity is the virtual volume "V1000". The virtual volume table 6000 shows that the virtual pool 1060 that is associated with the virtual volume "V1000" is one that is identified by "P100" (hereinafter referred to as virtual pool "P100"). The virtual pool capacity table 7000 shows that the virtual pool "P100" has a total capacity of 500 G and an allocated capacity of 100 G. The free capacity of the virtual pool "P100" is therefore 400 G and 400 G of data can be allocated to this virtual pool. The server volume table 11000 shows that the server-used capacity of the virtual volume "V1000" is 200 G. Since 200 G of server-used capacity can be secured with 400 G of free capacity, the next step in this case is Step 16060.

In the case of the virtual volume "V2000", information obtained in the above-mentioned manner shows that the free capacity is 100 G and the server-used capacity is 150 G. Since securing the server-used capacity with the free capacity is not possible in this case, the next step is Step 16030.

In Step 16020, whether or not the free capacity is equal to or larger than the server-used capacity may be judged in relation to a threshold of the virtual pool 1060 as will be described later. For example, when the allocated capacity of the virtual pool "P100" is 250 G, registering the server-used capacity of the virtual volume "V1000", 200 G, under the virtual pool "P100" in a manner described below makes the allocated capacity of the virtual pool "P100" 450 G, which exceeds the threshold 7040. Then, an alert has to be issued. In such cases, the management computer 1300 may judge that there is no free capacity and proceed to Step 16030.

The management computer 1300 uses the virtual volume capacity management program 1335 to obtain, through the storage system cooperation program 1332, information on real volumes of the storage system 1000 (Step 16030). In other words, the management computer 1300 obtains information in the real volume table 8000.

After Step 16030 is finished, the processing proceeds to Step 16040.

The management computer 1300 uses the virtual volume capacity management program 1335 to judge whether or not the virtual pool volume 1052 that is equal to or larger than the server-used capacity of the virtual volume 1051 to be reduced in allocated capacity can be added to the virtual pool 1060 obtained in Step 16010 (Step 16040). Information about the real volumes 1050 that can be added as the virtual pool volumes 1052 to this virtual pool 1060 has been obtained in Step 16030. If it is confirmed from the real volume table 8000 that changing at least one real volume 1050 into the virtual pool volumes 1052 makes the free capacity of the virtual pool 1060 equal to or larger than the server-used capacity of the virtual volume 1051 to be reduced in allocated capacity, Step 16040 is finished successfully.

For example, in the case of the virtual volume "V2000", the answer to Step 16020 is "No" and Step 16030 is executed followed by Step 16040. The virtual volume "V2000" is associated with a virtual pool "P200" as shown in the virtual volume table 6000. The free capacity of the virtual pool "P200" is 100 G, which is calculated from the virtual pool capacity table 7000 by subtracting the allocated capacity "300 G" of the virtual pool "P200" from the total capacity "400 G" of the virtual pool "P200". The server-used capacity of the virtual volume "V2000" is 150 G according to the server volume table 1100.

In this case, adding a 50-G capacity to the virtual pool "P200" makes the free capacity of the virtual pool "P200" equal to or larger than the server-used capacity of the virtual volume "V2000". A reference to the real volume table 8000 shows that this can be done by adding a real volume "V30" or "V40" to the virtual pool "P200". To avoid an alert about the threshold, the real volume "V30", not "V40", should be added.

When Step 16040 is finished successfully, the processing proceeds to Step 16050. When Step 16040 fails, in other words, when a free capacity as large as the server-used capacity of the virtual volume 1051 to be reduced in allocated capacity cannot be secured by adding at least one real volume 1050 as the virtual pool volume 1052, the processing moves to Step 18000 (C). Step 18000 and subsequent steps will be described with reference to FIG. 18.

The management computer 1300 calls up the virtual volume setting program 1333 from the virtual volume capacity management program 1335 to select the real volume 1050 that has a capacity equal to or larger than the server-used capacity of the virtual volume 1051 to be reduced in allocated capacity (Step 16050). Through the storage system cooperation program 1332, the virtual volume setting program 1333 adds the real volume 1050 selected in Step 16050 to the virtual pool 1060 selected in Step 16010, thereby changing the real volume 1050 into a new virtual pool volume 1052.

More precisely, the storage system 1000 receives a request to add to the above-mentioned selected virtual pool 1060 and sets the above-mentioned selected real volume 1050 as a new virtual pool volume 1052. This is accompanied by an update of the virtual pool capacity table 7000 to increase the total capacity of the virtual pool 1060 to which the virtual pool volume 1052 is added by the capacity of the added virtual pool volume 1052. The storage system 1000 then deletes from the real volume table 8000 information on the real volume 1050 newly set as the virtual pool volume 1052.

To take the above-mentioned example, the real volume "V30" is added as a new virtual pool volume 1052 to the virtual pool "P200" associated with the virtual volume "V2000". The total capacity of the virtual pool "P200" is therefore changed to 600 G in the virtual pool capacity table 7000, and information on the real volume "V30" is deleted from the real volume table 8000.

After Step 16050 is finished, the processing proceeds to Step 16060.

The management computer 1300 calls up the virtual volume setting program 1333 from the virtual volume capacity management program 1335, and instructs the virtual volume setting program 1333 to create, in the virtual pool 1060 obtained in Step 16010, a new virtual volume 1051 that has the same virtual capacity as that of the virtual volume 1051 selected in Step 16000 (Step 16060). The virtual volume 1051 created in this step is used as a migration destination in transparent file migration, which will be described later.

Through the storage system cooperation program 1332, the virtual volume setting program 1333 creates in the virtual pool 1060 selected in Step 16010 a new virtual volume 1051 that has the same virtual capacity as that of the virtual volume 1051 selected in Step 16000. The virtual volume setting program 1333 then sets the newly created virtual volume 1051 such that the new virtual volume 1051 is recognizable to the server 1100.

More precisely, the storage system 1000 receives the volume creation request and creates the virtual volume 1051. This is accompanied by the addition of information on the new virtual volume 1051 to the virtual volume table 6000. The ID of the new virtual volume 1051 may be set automatically by the storage system 1000, or may be set by the user or the management computer 1300.

To take the above-mentioned example, when the allocated capacity of the virtual volume "V2000" is to be reduced, a new virtual volume 1051 is added to the virtual pool "P200". Information to be registered in the virtual volume table 6000 is determined by the virtual volume capacity management program 1335 and, as virtual volume ID information, a free number (unassigned number) is searched for in the storage system 1000.

Assuming that the tables of FIGS. 6 to 10 hold information on every volume, "V2001", for example, is a free number and accordingly determined as the ID of the newly created virtual volume 1051. Since the virtual volume "V2001" is added to the virtual pool "P200", "P200" is registered as the virtual pool ID information. As the virtual capacity 6030 of the virtual volume "V2001", which only needs to be as large as the virtual capacity of the virtual volume "V2000", "800 G" is registered. As the actually allocated capacity 6040, "0 G" is registered because data write to the virtual volume "V2001" has never been executed at this point.

Figure 17:
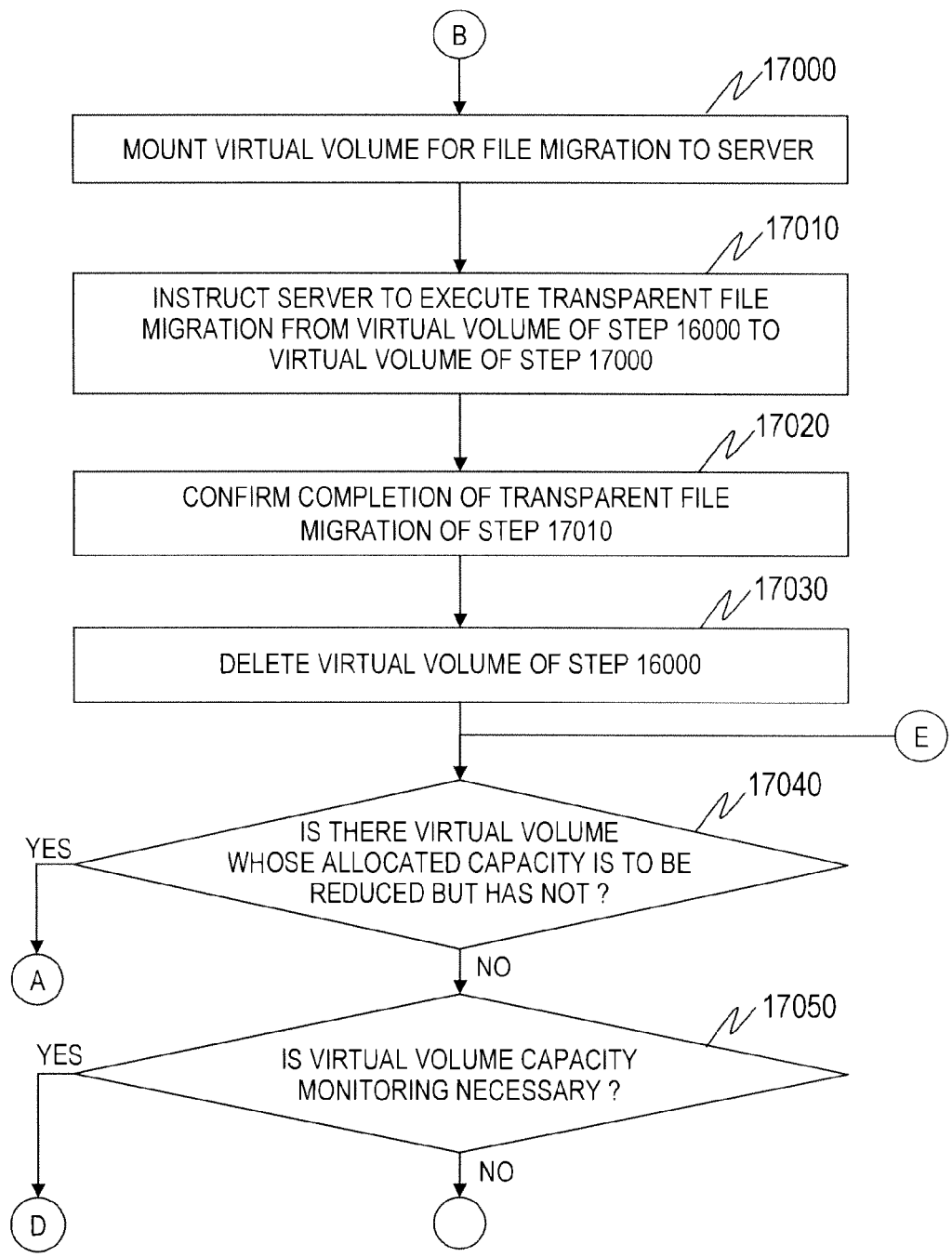
FIG. 17 is an example of a flow chart showing processing of reducing the allocated capacity of a specific virtual volume through file migration according to the first embodiment of this invention.

After Step 16060 is finished, the processing proceeds to Step 17000 (B). Step 17000 and subsequent steps, which will be described with reference to FIG. 17, are steps of reducing the allocated capacity of a specific virtual volume 1051 through file migration.

For instance, when the virtual volume "V1000" is to be reduced in allocated capacity, a new virtual volume 1051 having a virtual capacity of 2 T is created in the virtual pool "P100".

In Step 16060 described above, a new virtual volume 1051 that has the same virtual capacity as that of the virtual volume 1051 selected in Step 16000 (i.e., migration source virtual volume 1051) is created as a migration destination. However, the server 1100 can execute transparent file migration described below if the migration destination virtual volume 1051 has a virtual capacity as large as the server-used capacity of the migration source virtual volume 1051. It is therefore sufficient if the virtual capacity of the migration destination virtual volume 1051 is at least as large as the server-used capacity of the virtual volume 1051 selected in Step 16000, and does not need to be the same as the virtual capacity of the migration source virtual volume 1051.

Further, instead of creating a new virtual volume 1051, an existing virtual volume 1051 that is unused may be employed as the migration destination, if there is any.

Through the processing of FIG. 16, the virtual volume 1051 that serves as a file migration destination is created as described above.

FIG. 17 is an example of a flow chart showing processing of reducing the allocated capacity of a specific virtual volume 1051 through file migration according to the first embodiment of this invention.

The management computer 1300 uses the virtual volume capacity management program 1335 to instruct, through the server cooperation program 1331, the server 1100 to mount a virtual volume for file migration, namely, the virtual volume 1051 created in Step 16060 (Step 17000). This instruction is given to enable the server 1100 to handle the virtual volume for file migration. The server 1100 uses the server volume access program 1134 to execute the volume mounting. The volume mounting is accomplished by a conventional file system function.

To take the above-mentioned example, the virtual volume "V2001", which has been created in Step 16060 as the virtual volume for file migration, is mounted to the server 1100. The server 1100 registers the newly mounted virtual volume "V2001" in the server volume table 11000. More specifically, a virtual volume ID "V2001" is registered as the server volume 11010, "800 G" is registered as the capacity 11020, "0 G" is registered as the used capacity 11030, and nothing is registered as the file 11040. The capacity 11020 here is 800 G in accordance with the example given above to describe Step 16060. The used capacity 11030 here is 0 G and the cell for the file 11040 here is left blank because no files have been written in the virtual volume "V2001" yet.

After Step 17000 is finished, the processing proceeds to Step 17010. The management computer 1300 uses the virtual volume capacity management program 1335 to instruct, through the server cooperation program 1331, the server 1100 to make all files from the virtual volume 1051 selected in Step 16000 migrate to the virtual volume 1051 mounted to the server 1100 in Step 17000 by transparent file migration (Step 17010).

For example, when the virtual volume 1051 selected in Step 16000 is the virtual volume "V1000", which stores files F1, F2, F3, and F4 according to the server volume table 11000, the virtual volume capacity management program 1335 instructs the server 1100 to make, by transparent file migration, all of the files F1, F2, F3, and F4 migrate to the virtual volume 1051 mounted to the server 1100 in Step 17000, in the above-mentioned example, to the virtual volume "V2001".

When the virtual volume 1051 selected in Step 16000 is the virtual volume "V2000", the server 1100 makes files migrate in a transparent manner from the virtual volume "V2000" to the virtual volume "V2001" by reading all stored files out of the virtual volume "V2000" and writing all of the read files in the virtual volume "V2001".

The storage system 1000 reads, upon request from the server 1100, data of all files stored in the virtual volume "V2000" out of a physical storage area in the virtual pool 1060 that is associated with the virtual volume "V2000", and writes the read data in a physical storage area in the virtual pool 1060 that is associated with the virtual volume "V2001". In writing the data, the storage system 1000 allocates (as a chunk) the physical storage area of the virtual pool 1060 to only part of the storage area of the virtual volume "V2001" in which the data is to be written.

Since the files have migrated to the virtual volume "V2001" and no files remain in the virtual volume "V2000", the information on the virtual volume "V2000" in the server volume table 11000 is updated to register "0 G" as the used capacity 11030 and to clear the cell for the file 11040. With files having migrated from the virtual volume "V2000", the information on the virtual volume "V2001" in the server volume table 11000 is also updated to register "150 G" as the used capacity 11030 and to register files F5 and F6, which have been stored in the virtual volume "V2000" prior to the execution of the migration, as the file 11040.

After Step 17010 is finished, the processing proceeds to Step 17020. The management computer 1300 uses the virtual volume capacity management program 1335 to check, through the server cooperation program 1331, whether or not the transparent file migration instructed in Step 17010 has been completed (Step 17020). The check may be made by issuing an inquiry to the server 1100 regularly, or by receiving a completion notification from the server 1100. When the completion of the transparent file migration is confirmed, Step 17020 is finished.

After Step 17020 is finished, the processing proceeds to Step 17030.

Through the above-mentioned processing, all files are made to migrate by transparent file migration from a virtual volume selected in Step 16000 to a virtual volume mounted to the server in Step 17000. At the time the completion of file migration is confirmed in Step 17020, only files used by the server 1100 out of stored files of the virtual volume 1051 selected in Step 16000 have migrated to the virtual volume 1051 of Step 17000. After the migration is completed, the virtual volume 1051 of Step 16000 is no longer used by the server 1100 and can therefore be deleted.

Steps 17010 and 17020 involve data write by the storage system 1000 in the virtual volume 1051 created in Step 16060. The virtual volume table 6000, the virtual pool capacity table 7000, the virtual pool table 9000, and the virtual volume allocation table 10000 are updated such that information in the tables is consistent with the result of the data write.

To take the above-mentioned example where the virtual volume "V2000" is to be reduced in allocated capacity and the virtual volume "V2001" serves as the transparent file migration destination, the actually allocated capacity 6040 of the virtual volume "V2001" is updated. Specifically, the same capacity as the server-used capacity of the virtual volume "V2000" prior to the transparent file migration is registered as the actually allocated capacity 6040 of the virtual volume "V2001" after the transparent file migration. As a result, the actually allocated capacity 6040 of the virtual volume "V2001", which has been "0 G" in Step 16060, is updated to "150 G" after Step 17020 is finished.

The virtual pool capacity table 7000 is also updated and the allocated capacity 7030 of the virtual pool "P200" is changed from "300 G" to "450 G". In the virtual pool table 9000, the allocation state 9050 of the virtual pool "P200" is updated, although an entry for the virtual pool "P200" is omitted from FIG. 9. In the above-mentioned example, a chunk of 150 G is allocated for every 2 G of the storage area space of the virtual volume "V2001". The virtual volume ID of the virtual volume 1051 to which those chunks are allocated, namely, "V2001", is registered as the allocation state 9050 of the chunks. The virtual volume allocation table 10000 is similarly updated to register "P200", which is the virtual pool ID associated with "V2001", as the virtual pool ID 10020, the ID of the allocated chunks as the chunk ID 10030, and the allocated LBA information as the allocated LBA 10040, in an entry for the virtual volume "V2001".

The management computer 1300 uses the virtual volume capacity management program 1335 to instruct the virtual volume setting program 1333 to delete the virtual volume 1051 selected in Step 16000 (Step 17030). Through the storage system cooperation program 1332, the virtual volume setting program 1333 deletes the virtual volume 1051 selected in Step 16000. In the case where deleting the virtual volume 1051 selected in Step 16000 requires the deletion of settings about the allocation of the virtual volume 1051 to the host as well, the settings are deleted to prepare for the ultimate deletion of the virtual volume 1051, and then the virtual volume 1051 is deleted.

For instance, when the virtual volume 1051 to be deleted is the virtual volume "V2000", the virtual volume "V2000" itself is deleted. This is accomplished by the storage system 1000 by deleting the virtual volume "V2000" and updating the virtual volume table 6000, the virtual pool capacity table 7000, the virtual pool table 9000, and the virtual volume allocation table 10000 accordingly.

Specifically, information on the virtual volume 1051 to be deleted is erased from the virtual volume table 6000. To take the above-mentioned example, information about the virtual volume "V2000" is erased.

In the virtual pool capacity table 7000, the allocated capacity of the deleted virtual volume 1051 is removed to make the table's information consistent with facts after the deletion of the virtual volume 1051. When the virtual volume 1051 to be deleted is the virtual volume "V2000", which has had an allocated capacity of 300 G before deleted, 300 G is subtracted from the allocated capacity 7030 of the virtual pool "P200". On the other hand, the allocated capacity of the newly created virtual volume "V2001" which is 150 G is added to the allocated capacity 7030 of the virtual pool "P200". The example of FIG. 7 shows information before the virtual volume "V2000" is deleted and before the virtual volume "V2001" is created. As a result of the above-mentioned update, the allocated capacity 7030 of the virtual pool "P200" is changed to 150 G.

Information on the deleted virtual volume 1051 is erased also from the virtual pool table 9000 and the virtual volume allocation table 10000. In the above-mentioned example, information related to the allocation of the virtual volume "V2000" is erased.

The allocated capacity of the deleted virtual volume 1051 is returned to its associated virtual pool 1060 as a result of Step 17030. The returned allocated capacity is treated as a free capacity that can be newly allocated to other virtual volumes 1051 belonging to the same virtual pool 1060 as the deleted virtual volume 1051 did. The virtual volume 1051 created in Step 17010 is already allocated a capacity that has been used to store data written through the transparent file migration in Step 17020. Ultimately, a capacity that remains after subtracting the server-used capacity of Step 16000 from the virtual volume-allocated capacity of Step 16000 is freed up in Step 17030. The virtual pool 1060 is thus also reduced in allocated capacity (in other words, the free capacity of the virtual pool 1060 is increased) through the above-mentioned processing.

The management computer 1300 uses the virtual volume capacity management program 1335 to judge whether or not there is any virtual volume 1051 whose allocated capacity is to be reduced but has not (Step 17040). Specifically, the management computer 1300 searches the list of Step 15060 for the virtual volume 1051 that has not finished the allocated capacity reduction processing.

When the list has at least one virtual volume 1051 that has not finished allocated capacity reduction, the processing returns to Step 16000 (A) after Step 17040 to continue Step 16000 and subsequent steps. When the list has no virtual volume 1051 that has not finished allocated capacity reduction, in other words, when every virtual volume 1051 on the list of Step 15060 has finished allocated capacity reduction, the processing proceeds to Step 17050.

The management computer 1300 uses the virtual volume capacity management program 1335 to judge whether or not it is necessary to monitor the capacities of the virtual volumes 1051 (Step 17050). Specifically, in the case where this processing is executed based on the settings set through the window of FIG. 12 or 13, capacity monitoring needs to be continued and the processing returns to Step 15030 (D). In the case where this processing is not executed automatically based on results of capacity monitoring, which is when this processing is executed manually based on, for example, the settings set through the window of FIG. 14, this processing is ended at this point.

There may be cases where the user decides that capacity monitoring can be stopped despite the processing being executed automatically based on results of capacity monitoring. In anticipation for such event, the management computer 1300 may prompt the user in Step 17050 to judge whether or not capacity monitoring needs to be continued. Then, desirably, a window or a command line that enables the user to choose whether the continuation of capacity monitoring is necessary or not is prepared.

Figure 18:
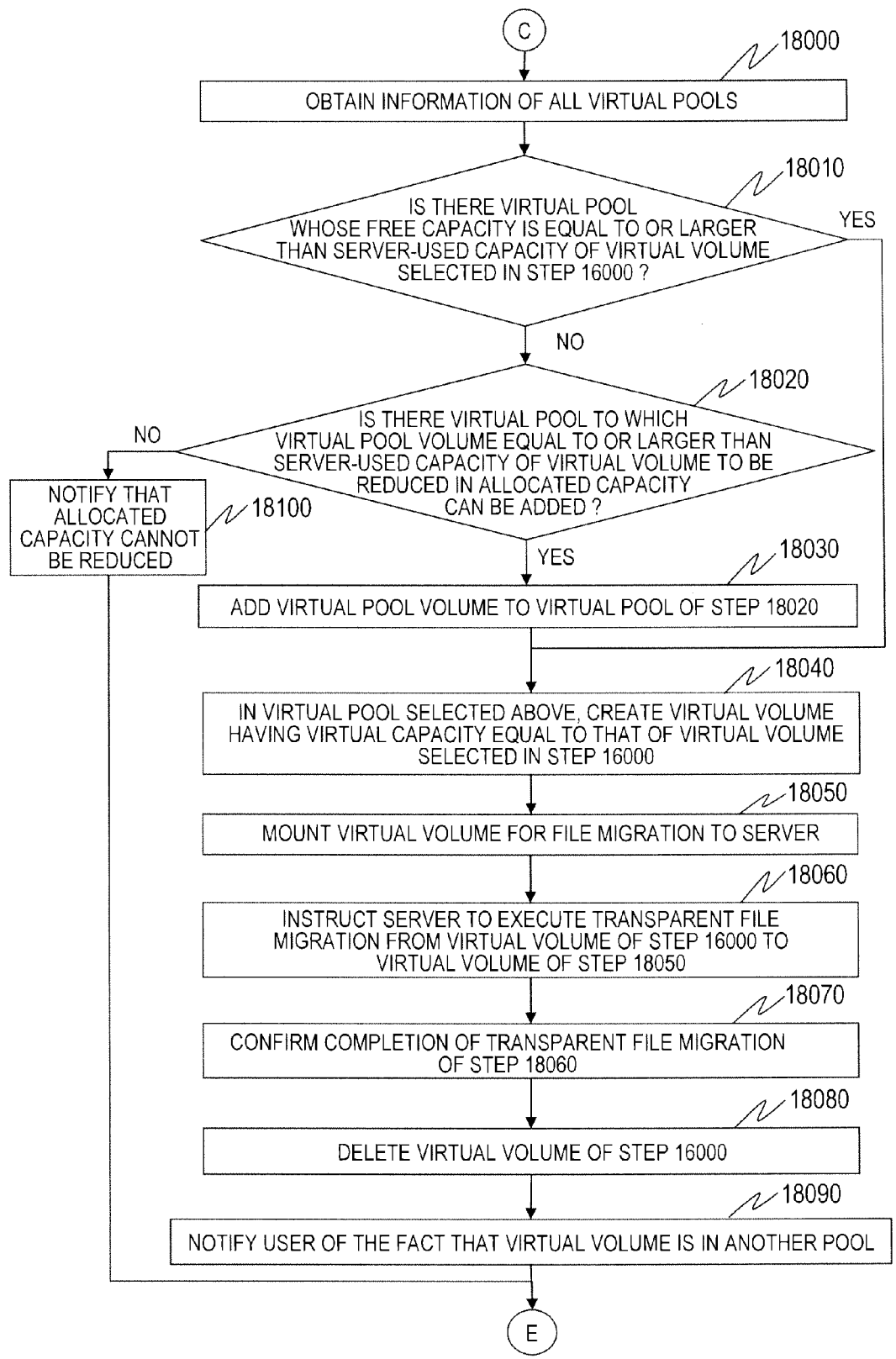
FIG. 18 is an example of a flow chart showing processing of reducing the allocated capacity of a specific virtual volume through file migration to another virtual volume in another virtual pool according to the first embodiment of this invention.

FIG. 18 is an example of a flow chart showing processing of reducing the allocated capacity of a specific virtual volume 1051 through file migration to another virtual volume 1051 in another virtual pool 1060 according to the first embodiment of this invention.

As has been described, the processing of FIG. 17 reduces the allocated capacity of one virtual volume 1051 by making stored files migrate from this virtual volume 1051 to another virtual volume 1051 in the same virtual pool 1060 to which the virtual volume 1051 to be reduced in allocated capacity belongs. In contrast, processing shown in FIG. 18 reduces the allocated capacity of one virtual volume 1051 by making stored files migrate from this virtual volume 1051 to another virtual volume 1051 in another virtual pool 1060 different from the one to which the virtual volume 1051 to be reduced in allocated capacity belongs. In the following description, the virtual pools 1060 that are not the one to which the virtual volume 1051 to be reduced in allocated capacity belongs are referred to as other virtual pools 1060.

The processing of FIG. 18 is the same as the processing shown in FIGS. 16 and 17 except that one of the virtual volumes 1051 belonging to one of the other virtual pools 1060 is designated as the file migration destination.

To store a file in a virtual volume, part of the storage area of the virtual volume is secured as a meta data area. The meta data area stores meta data information for each file expressed as being stored in the virtual volume. Meta data information includes attributes information of its associated file (for example, read/write attributes, the time of creation, and the updated time), and information about a location within the virtual volume at which data written as data about the file is stored.

How the file name of a file is managed in relation to the file varies depending on the type of file system. In one example, the virtual volume stores name space information which holds a file name (including a path name) paired with an identifier that identifies its associated meta data information (the name space information corresponds to a set of directory files in the case of Unix). Data about a file created in the past and later deleted is left in the virtual volume in some cases, and meta data information associated in the past may remain in the virtual volume. However, a deleted file does not exist in the name space information.

A file server having a file system program thus reads a file that is specified by its file name by referring to the name space information to identify meta data information that is associated with the specified file name, referring to the identified meta data information to identify a location in a virtual volume where data of the specified file is stored, and then issuing an I/O request that specifies the identified location (this applies to read and write of file data, particularly so in data read). The I/O request directed to the storage system specifies a fixed-length block.

To newly write a file specified by its file name, on the other hand, the file server having a file system program secures meta data information, pairs the secured meta data information with the file name associated with the new file, stores the pair in the name space information and, when data is to be written, stores a storage area for storing the write data in a virtual volume and writes, in the meta data information, the above-mentioned attributes as well as the location where the write data is written.

In making at least one file stored in the above-mentioned virtual volume migrate, the file server can exclude data of a deleted file as a migration subject by identifying the file name of each file that is currently stored in the name space. The file server thereafter can make data of the file migrate while creating file attributes and a name space in a new virtual volume by using the above-mentioned read processing and write processing in combination (however, the attributes stored in the meta data information have to be specified or copied upon file creation).

The processing shown in FIG. 18 is executed when it is judged in Step 16040 of FIG. 16 that a free capacity as large as the server-used capacity of the virtual volume 1051 to be reduced in allocated capacity cannot be secured by adding at least one real volume 1050 as the virtual pool volume 1052.

The management computer 1300 uses the virtual volume capacity management program 1335 to obtain, through the storage system cooperation program 1332, information on all virtual pools in the storage system 1000 from the storage system 1000 (Step 18000). Specifically, the information on all virtual pools is obtained from the virtual pool capacity table 7000. The information on all virtual pools may be obtained when virtual pool information is obtained in Step 16010. In this case, Step 18000 does not need to be executed.

After Step 18000 is finished, the processing proceeds to Step 18010.

The management computer 1300 uses the virtual volume capacity management program 1335 to judge for each of the other virtual pools 1060 whose information has been obtained in Step 18000 whether or not the free capacity of the other virtual pool 1060 is equal to or larger than the server-used capacity of the virtual volume 1051 to be reduced in allocated capacity (Step 18010). The server-used capacity of the virtual volume 1051 to be reduced in allocated capacity is already obtained information, and the management computer 1300 bases the judgment about whether or not the free capacity of the other virtual pool 1060 is as large as this server-used capacity on the virtual pool capacity table 7000. When the free capacity of the other virtual pool 1060 obtained in Step 18000 is as large as the server-used capacity, data of the virtual volume 1051 to be reduced in allocated capacity can migrate to this other virtual pool 1060.

When it is judged in Step 18010 that the other virtual pool 1060 has a free capacity equal to or larger than the server-used capacity of the virtual volume 1051 to be reduced in allocated capacity, the processing proceeds to Step 18040 and, when it is not, the processing moves to Step 18020.

For example, when the virtual volume "V2000" is to be reduced in allocated capacity and the real volumes "V30" and "V40" each have a capacity of 20 G (which is less than 50 G) according to the real volume table 8000, adding any one of those real volumes 1050 to the virtual pool "P200" increases the free capacity of the virtual pool "P200" only to 120 G as shown in FIGS. 7 and 8. The increased free capacity is still smaller than the server-used capacity of the virtual volume "V2000". Therefore, the answer to Step 16040 is "No" and Step 18010 is executed.

In this case, the judgment of Step 18010 needs to be made about the free capacity of the other virtual pool 1060 and the server-used capacity of the virtual volume "V2000". Here, if a plurality of virtual pools 1060 are obtained in Step 18000, the virtual pool 1060 whose allocated capacity is the smallest of the obtained virtual pools 1060 is chosen as the other virtual pool 1060 in order to simplify the explanation.

Since the server-used capacity of the virtual volume "V2000" is 150 G, any virtual pool 1060 in the virtual pool capacity table 7000 whose free capacity is 150 G or more and whose allocated capacity is small is selected and examined one by one. In this example, the virtual pool 1060 that meets the criterion is the virtual pool "P300". The free capacity of the virtual pool "P300" is 450 G in the example of FIG. 7. This free capacity is judged as being larger than the server-used capacity of the virtual volume "V2000" which is 150 G (Step 18010). Then, the processing proceeds to Step 18040.

The management computer 1300 uses the virtual volume capacity management program 1335 to judge whether or not a new virtual pool volume 1052 equal to or larger than the server-used capacity of the virtual volume 1051 to be reduced in allocated capacity can be added to the virtual pool 1060 obtained in Step 18000 (Step 18020). Information on the real volumes 1050 that can be added as the virtual pool volumes 1052 to the virtual pool 1060 (i.e., the real volume table 8000) has already been obtained in Step 16030. If it is confirmed from the real volume information that changing at least one real volume 1050 into the virtual pool volume 1052 makes the free capacity of the virtual pool 1060 equal to or larger than the server-used capacity of the virtual volume 1051 to be reduced in allocated capacity, Step 18020 is finished successfully.

When Step 18020 is finished successfully, the processing proceeds to Step 18030. When Step 18020 fails, in other words, when a free capacity as large as the server-used capacity of the virtual volume 1051 to be reduced in allocated capacity cannot be secured by adding at least one real volume 1050 as the virtual pool volume 1052, the processing moves to Step 18100.

For example, in the case where the virtual volume 1051 to be reduced in allocated capacity is the virtual volume "V2000", Step 18100 is executed when, unlike the example of FIG. 7, the virtual pool "P100" is not registered in the virtual pool capacity table 7000 and the allocated capacity 7030 of the virtual pool "P300" is 360 G (in other words, the free capacity of the virtual volume "P300" is 140 G), and when, unlike the example of FIG. 8, a real volume "V50" is the only real volume 1050 present.

In this case, the judgment of Step 16020 needs to be made about the free capacity of the other virtual pool 1060 and the server-used capacity of the virtual volume "V2000". Here, the virtual pool 1060 whose allocated capacity is small (in the above-mentioned example, the virtual pool "P300") is chosen as the other virtual pool 1060 in order to simplify the explanation. Further, the thresholds of the virtual pools 1060 are ignored here.

Since the server-used capacity of the virtual volume "V2000" is 150 G, the real volume 1050 is added to the virtual pool "P300". For example, changing the real volume "V50" (20 G) into a new virtual pool volume 1052 and adding this virtual pool volume 1052 make the free capacity of the virtual pool "P300" 160 G. With enough free capacity secured, the processing proceeds to Step 18030. On the other hand, if the virtual pool thresholds are to be considered, or when the size of the real volume "V50" is 5 G, the server-used capacity cannot be secured in the virtual pool "P300" and the processing proceeds to Step 18100.

The management computer 1300 calls up the virtual volume setting program 1333 from the virtual volume capacity management program 1335 to select which real volume 1050 is to be changed into a new virtual pool volume 1052 that is equal to or larger than the server-used capacity of the virtual volume 1051 to be reduced in allocated capacity (Step 18030). Through the storage system cooperation program 1332, the virtual volume setting program 1333 changes the selected real volume 1050 into the virtual pool volume 1052 and adds the virtual pool volume 1052 to the virtual pool 1060 selected in Step 18020. In short, processing equivalent to the one in Step 16050 is executed.

After Step 18030 is finished, the processing proceeds to Step 18040.

The management computer 1300 calls up the virtual volume setting program 1333 from the virtual volume capacity management program 1335, and instructs the virtual volume setting program 1333 to create, in the virtual pool 1060 obtained in Step 18010 or 18020, a new virtual volume 1051 that has the same virtual capacity as that of the virtual volume 1051 selected in Step 16000 (Step 18040). Through the storage system cooperation program 1332, the virtual volume setting program 1333 creates in the virtual pool 1060 selected in Step 18010 or 18020 a new virtual volume 1051 that has the same virtual capacity as that of the virtual volume 1051 selected in Step 16000. In short, processing equivalent to the one in Step 16060 is executed.

After Step 18040 is finished, the processing proceeds to Step 18050. For example, when the virtual volume 1051 to be reduced in allocated capacity is the virtual volume "V2000", the created virtual volume 1051 has a capacity of 800 G, which is the virtual capacity of the virtual volume "V2000".

As has been described with reference to FIG. 16, the server 1100 can execute transparent file migration described below when the virtual capacity of the migration destination virtual volume 1051 is as large as the server-used capacity of the migration source virtual volume 1051. It is therefore sufficient if the virtual capacity of the migration destination virtual volume 1051 is at least as large as the server-used capacity of the virtual volume 1051 selected in Step 16000, and does not need to be the same as the virtual capacity of the migration source virtual volume 1051.

Further, instead of creating a new virtual volume 1051, an existing virtual volume 1051 that is unused may be employed as the migration destination, if there is any.

The management computer 1300 uses the virtual volume capacity management program 1335 to instruct, through the server cooperation program 1331, the server 1100 to mount a virtual volume for file migration, namely, the virtual volume 1051 created in Step 18040 (Step 18050). The management computer 1300 gives the instruction in order to enable the server 1100 to handle the virtual volume for file migration. The server 1100 uses the server volume access program 1134 to mount the virtual volume 1051 as instructed. The volume mounting is accomplished by a conventional file system function. In short, processing equivalent to the one in Step 17000 is executed.

After Step 18050 is finished, the processing proceeds to Step 18060.

The management computer 1300 uses the virtual volume capacity management program 1335 to instruct, through the server cooperation program 1331, the server 1100 to make all files from the virtual volume 1051 selected in Step 16000 migrate to the virtual volume 1051 mounted to the server 1100 in Step 18050 by transparent file migration (Step 18060). In short, processing equivalent to the one in Step 17010 is executed.

For example, when the virtual volume 1051 selected in Step 16000 is the virtual volume "V2000", which has the files F5 and F6 according to the server volume table 11000, the files F5 and F6 are both made to migrate by transparent file migration to the virtual volume 1051 mounted to the server 1100 in Step 18050.

After Step 18060 is finished, the processing proceeds to Step 18070.

The management computer 1300 uses the virtual volume capacity management program 1335 to check, through the server cooperation program 1331, whether or not the transparent file migration instructed in Step 18060 has been completed (Step 18070). In short, processing equivalent to the one in Step 17020 is executed. The check may be made by issuing an inquiry to the server 1100 regularly, or by receiving a completion notification from the server 1100. When the completion of the transparent file migration is confirmed, Step 18070 is finished.

After Step 18070 is finished, the processing proceeds to Step 18080.

Through the above-mentioned processing, all files are made to migrate by transparent file migration from a virtual volume selected in Step 16000 to a virtual volume mounted to the server in Step 18050. At the time the completion of file migration is confirmed in Step 18070, only files used by the server 1100 out of stored files of the virtual volume 1051 selected in Step 16000 have migrated to the virtual volume 1051 of Step 18050. After the migration is completed, the virtual volume 1051 of Step 16000 is no longer used by the server 1100 and can therefore be deleted.

The management computer 1300 uses the virtual volume capacity management program 1335 to instruct the virtual volume setting program 1333 to delete the virtual volume 1051 selected in Step 16000 (Step 18080). Through the storage system cooperation program 1332, the virtual volume setting program 1333 deletes the virtual volume 1051 selected in Step 16000. In the case where deleting the virtual volume 1051 selected in Step 16000 requires the deletion of settings about the allocation of the virtual volume 1051 to the host as well, the settings are deleted to prepare for the ultimate deletion of the virtual volume 1051, and then the virtual volume 1051 is deleted. In short, processing equivalent to the one in Step 17030 is executed.

The allocated capacity of the deleted virtual volume 1051 is returned to its associated virtual pool 1060 as a result of Step 18080. The returned allocated capacity is treated as a free capacity that can be newly allocated to other virtual volumes 1051 belonging to the same virtual pool 1060 as the deleted virtual volume 1051 did. The virtual volume 1051 created in Step 18040 is already allocated a capacity that has been used to store data written through the transparent file migration in Step 18060. Ultimately, a capacity that remains after subtracting the server-used capacity of Step 16000 from the virtual volume-allocated capacity of Step 16000 is freed up in Step 18080. The virtual pool 1060 is thus also reduced in allocated capacity through the above-mentioned processing.

The management computer 1300 uses the virtual volume capacity management program 1335 to notify the fact that files of the virtual volume 1051 has migrated to the other virtual pool 1060 (Step 18090). The processing then returns to Step 17040 of FIG. 17 (E).

When Step 18020 fails, the management computer 1300 uses the virtual volume capacity management program 1335 to notify the fact that the allocated capacity reduction of the virtual volume 1051 to be reduced in allocated capacity is inexecutable because the virtual volume 1051 that can serve as the migration destination for the virtual volume 1051 to be reduced in allocated capacity cannot be created (Step 18100). The processing then returns to Step 17040 of FIG. 17 (E).

By the processing up through FIGS. 15 to 18, the virtual volume 1051 that serves as the transparent file migration destination is created in the other virtual pool 1060 and the allocated capacity reduction of the virtual volume 1051 to be reduced in allocated capacity is thus accomplished.

As described above, the capacity that has been allocated to the virtual volume 1051 selected in Step 16000 (for example, the virtual volume "V2000") is freed up to join the virtual pool 1060 to which this virtual volume 1051 has belonged (for example, the virtual pool "P200"). The freed up capacity may be used to create a new virtual volume 1051 in the virtual pool 1060 to which the virtual volume 1051 selected in Step 16000 has belonged (e.g., the virtual pool "P200"), to make the data of this virtual volume 1051 which has migrated to another virtual pool (e.g., the virtual pool "P300") migrate to the newly created virtual volume 1051 through transparent file migration. This way, the data that has migrated to another virtual pool 1060 once is made to migrate back to its original virtual pool 1060.

The above-mentioned processing is accomplished by using Steps 18040 to 18080. However, the migration source in those steps is the virtual volume 1051 previously created in the other virtual pool 1060, and the migration destination in those steps is the virtual volume 1051 newly created in the virtual pool 1060 to which the virtual volume 1051 selected in Step 16000 has belonged.

In this embodiment, when file write is not executed in one virtual volume 1051, data may migrate from this virtual volume 1051 to the real volume 1050 whose capacity is at least as large as the server-used capacity of this virtual volume 1051. Whether file write is being executed or not can be judged from, for example, results of monitoring the file access pattern, or from the user's settings.

In this embodiment, if the threshold 7040 of one virtual pool 1060 is exceeded, the processing of FIG. 15 and subsequent flow charts may be executed for the virtual volumes 1051 associated with the virtual pool 1060.

When the answer is "Yes" in Steps 16020 and 16040 of FIG. 16, and Steps 18010 and 18020 of FIG. 18, conditions for the allocated capacity reduction of the virtual volume 1051 are met at that point. Then, the management computer 1300 may use its input/output device 1310 or the like to display a message to the user saying that the virtual volume-allocated capacity reduction is executable. Further, "Yes" in Step 16040 and Step 18020 means that a new virtual pool volume 1052 needs to be set to the virtual pool 1060, and a message to that effect may be displayed as well on the input/output device 1310 of the management computer 1300 or the like.

When it is judged in Step 15050 of FIG. 15 that the capacity difference has exceeded the usage ratio differential, the management computer 1300 may use the input/output device 1310 or the like to display a message to the user that informs of the fact that the capacity difference has exceeded the usage ratio differential, and that includes the virtual volume ID, the virtual capacity, the virtual volume-allocated capacity, and the server-used capacity at the time the event happened. The virtual volume ID, the virtual capacity, the virtual volume-allocated capacity, and the server-used capacity may be displayed in the same format as that of the virtual volume 14110, virtual capacity 14120, virtual volume-allocated capacity 14130, and server-used capacity 14140 of FIG. 14. In the case where information on the usage ratio differential is displayed as well, the usage ratio differential may be displayed on a volume basis in the manner described above.

Next, a second embodiment of this invention will be described.

Figure 19:
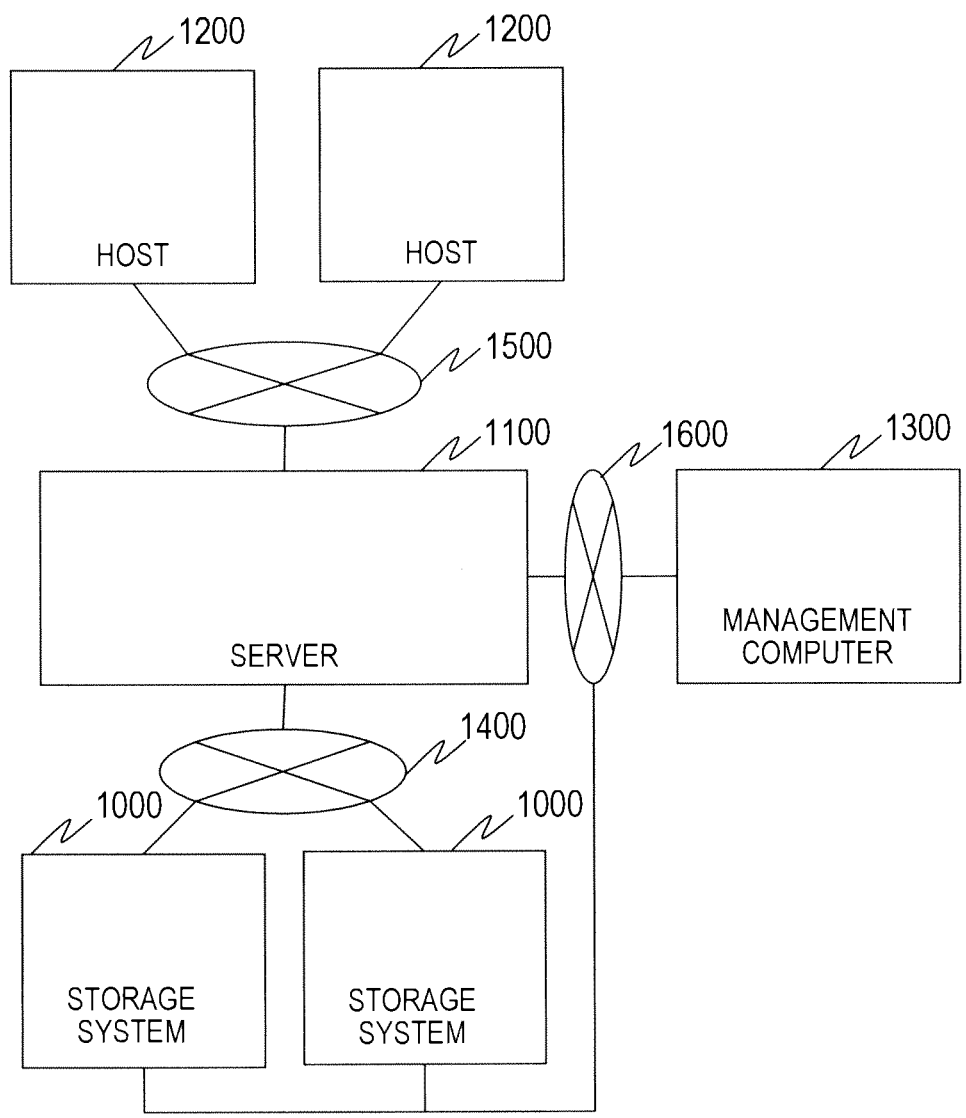
FIG. 19 is a block diagram showing a configuration of a computer system according to a second embodiment of this invention.

FIG. 19 is a block diagram showing a configuration of a computer system according to the second embodiment of this invention.

The computer system of the second embodiment shown in FIG. 19 is the same as the computer system of the first embodiment shown in FIG. 1 except that a plurality of storage systems 1000 are coupled to the server 1100.

FIGS. 2 to 18 and their descriptions apply to the computer system of the second embodiment as well.

In this embodiment, the management computer 1300 and the server 1100 manage a plurality of storage systems 1000 as described above. When the migration destination virtual volume 1051 belongs to another virtual pool 1060 as shown in FIG. 18, this other virtual pool 1060 may be chosen from among the virtual pools 1060 of the storage systems 1000 different from the one to which the virtual volume 1051 to be reduced in allocated capacity belongs.

The plurality of storage systems 1000 can thus be managed.

The setting window of FIG. 12 may have a field for entering the identifier of a specific storage system 1000 to set different conditions for different storage systems 1000.

Next, a third embodiment of this invention will be described.

Figure 20:
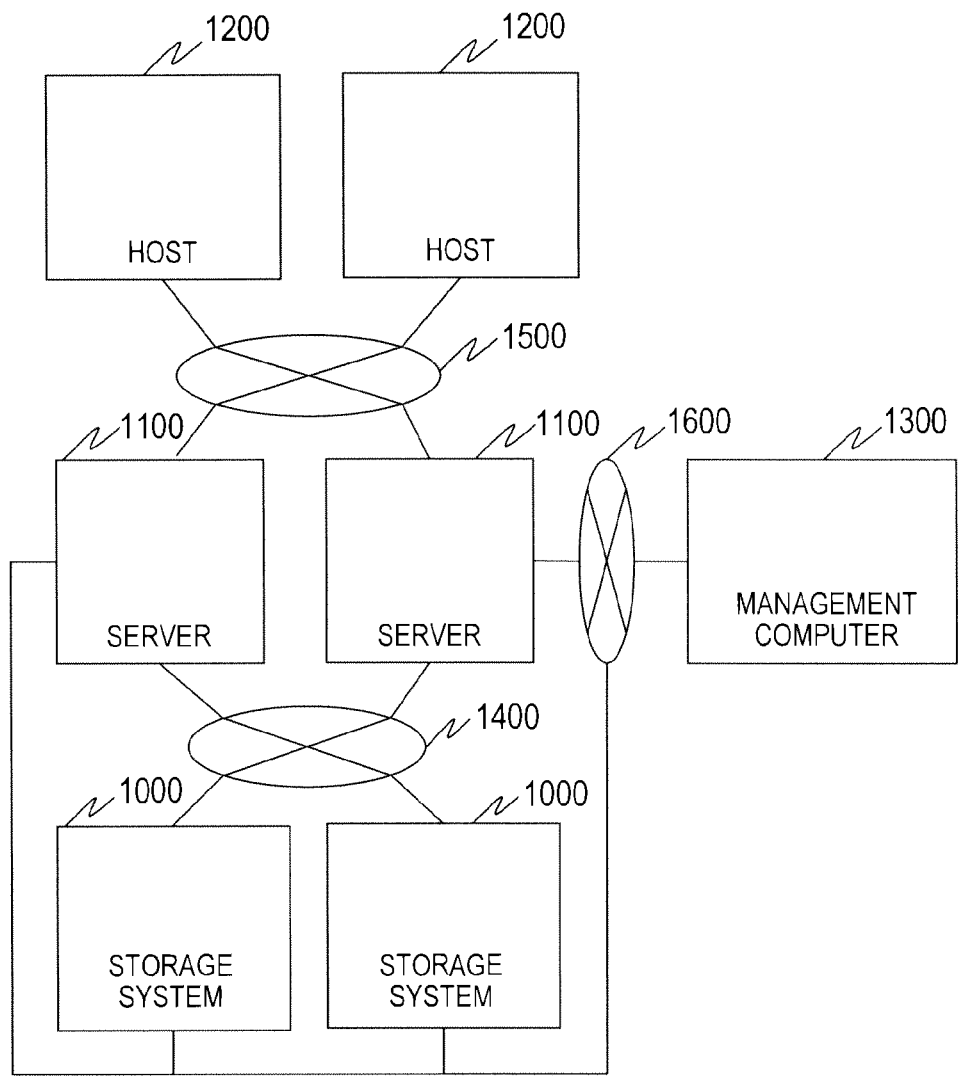
FIG. 20 is a block diagram showing a configuration of a computer system according to a third embodiment of this invention.

FIG. 20 is a block diagram showing a configuration of a computer system according to the third embodiment of this invention.

The computer system of the third embodiment shown in FIG. 20 is the same as the computer system of the second embodiment shown in FIG. 19 except that there are a plurality of servers 1100.

FIGS. 2 to 18 and their descriptions apply to the computer system of the third embodiment as well.

Global name space or a similar technology enables file virtualization among a plurality of servers 1100 with the use of a shared name space. For instance, a plurality of servers can share the same name space and store files in the name space by exchanging system location information among local file systems that are located in different servers. Using the shared name space makes file migration between servers transparent to hosts (transparent file migration). Transparent file migration can therefore be employed not only in file migration within a single server 1100 but also in file migration between different servers 1100.

Thus, a plurality of servers 1100 can be operated according to this invention.

Next, a fourth embodiment of this invention will be described.

Figure 21:
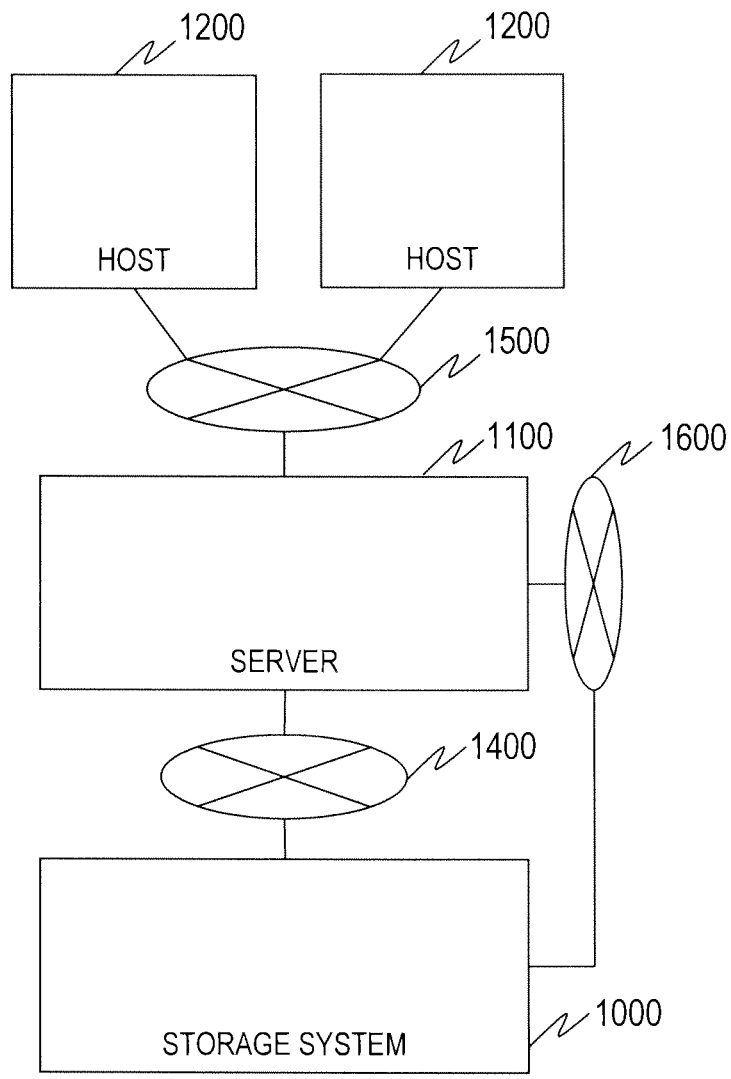
FIG. 21 is a block diagram showing a configuration of a computer system according to a fourth embodiment of this invention.

FIG. 21 is a block diagram showing a configuration of a computer system according to the fourth embodiment of this invention.

The computer system of the fourth embodiment shown in FIG. 21 is the same as the computer system of the first embodiment shown in FIG. 1 except that the management computer 1300 is eliminated by using the server 1100 to execute the processing of the management computer 1300 shown in the first embodiment. The server 1100 of this embodiment has a configuration different from that of the server 1100 of the first embodiment, and will be described with reference to FIG. 22.

FIGS. 2 and 4 to 18 and their descriptions apply to the computer system of the fourth embodiment as well.

The servers 1100 in the second and third embodiments can also execute the processing of the management computer 1300 as in the fourth embodiment. This mode is accomplished in the second and third embodiments by giving information held by the management computer 1300 to one of the servers 1100 to manage.

Figure 22:
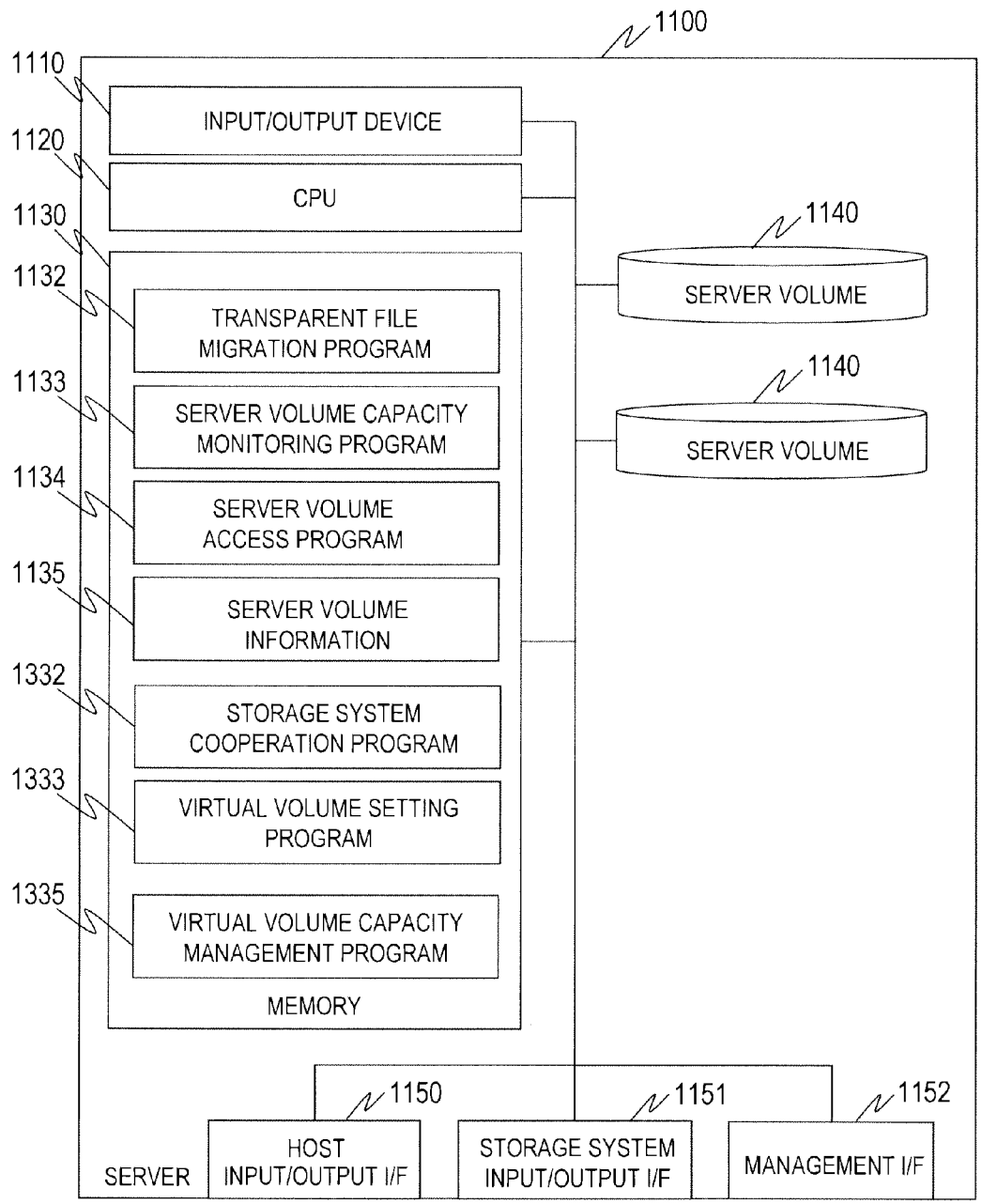
FIG. 22 is a block diagram showing a configuration of a server according to the fourth embodiment of this invention.

FIG. 22 is a block diagram showing a configuration of the server 1100 according to the fourth embodiment of this invention.

The server 1100 of the fourth embodiment shown in FIG. 22 is the same as the server 1100 of the first embodiment shown in FIG. 3 except for programs stored in the memory 1130.

Specifically, the storage system cooperation program 1332, the virtual volume setting program 1333, and the virtual volume capacity management program 1335, which are used by the management computer 1300 in the first embodiment, are stored in the memory 1130 of the server 1100 in the fourth embodiment. This enables the server 1100 to execute the processing that is executed by the management computer 1300 of the first embodiment.

The computer system of this embodiment which does not have the management computer 1300 has no need for the management computer cooperation program 1131, and the programs in the server 1100 enable information exchange within the server 1100. When setting conditions shown in the windows of FIGS. 12, 13, and 14, the conditions may be set by the server 1100 in the command line format, the file format, or the like, instead of using the windows. According to the fourth embodiment, the processing of this invention can be executed with a configuration that does not have the management computer 1300.

While the present invention has been described in detail and pictorially in the accompanying drawings, the present invention is not limited to such detail but covers various obvious modifications and equivalent arrangements, which fall within the purview of the appended claims.

What is claimed is:

1. A server computer reading from and writing to a storage system by a block access protocol,
   wherein the storage system is configured to define a virtual pool including a physical storage area of a storage media in the storage system and to provide a first virtual volume using the virtual pool so that the storage system is configured to allocate the physical storage area included in the virtual pool to the first virtual volume upon writing data to the first virtual volume,
   the server computer comprising:
      a memory storing a program; and
      a CPU configured to execute the program for:
         when files are stored to the first virtual volume, writing file name space information indicating names of the files and locations of data of the files on the first virtual volume, and writing data of the files to the first virtual volume;
         deleting a certain file in the first virtual volume so that a name of the certain file does not exist in the file name space information but in which data of the certain file is stored in the first virtual volume; and
         processing capacity reduction of the allocated area in the storage media by:
            (A) specifying at least one undeleted file indicated by the file name space information;
            (B) reading data of the at least one undeleted file from the first virtual volume, by the block access protocol;
            (C) writing the data of the at least one undeleted file to a second virtual volume which is different than the first virtual volume, by the block access protocol, wherein the second virtual volume is created for the capacity reduction using the virtual pool, so that the storage system is configured to allocate the physical storage area included in the virtual pool to the second virtual volume upon writing data to the second virtual volume;

wherein the first virtual volume is deleted so that allocated physical storage area of first virtual volume becomes unallocated physical storage area of the virtual pool; and wherein the virtual pool includes the physical storage area in the storage system and does not include a physical storage area in another storage system.

2. The server computer according to claim 1,
wherein the CPU is configured to execute the program for:
setting a first condition to start a processing of capacity reduction for a first allocated capacity range; and
setting a second condition to start a processing of capacity reduction for a second allocated capacity range.

3. The server computer according to claim 2,
wherein the CPU is configured to execute the program for: displaying correspondence between the virtual volumes and the first and second conditions.

4. The server computer according to claim 1,
wherein the CPU executes is configured to execute the program for:
setting a first condition to start a processing of capacity reduction for the first virtual volume; and
setting a second condition to start a processing of capacity reduction for another virtual volume.

5. The server computer according to claim 1,
wherein the server computer is coupled to another server computer,
wherein, in (C) storing data of the at least one file, the CPU is configured to execute the program for (C1) sending the data of the at least one file to the another server computer so that the another server computer is configured to store the data of the at least one file to the second virtual volume, and
wherein the CPU is configured to execute the program for changing a single file name space shared by the server computer and the another server computer.

6. The server computer according to claim 1,
wherein the server computer is coupled to a host computer, and the processing of capacity reduction is transparent to the host computer.

7. A non-transitory computer-readable medium storing a program for a server computer configured to read and write to a storage system via a block access protocol,
wherein the storage system is configured to define a virtual pool including a physical storage area of a storage media in the storage system and to provide a first virtual volume using the virtual pool so that the storage system is configured to allocate the physical storage area included in the virtual pool to the first virtual volume upon writing data to the first virtual volume,
wherein when files are stored to the first virtual volume, the server computer is configured to write file name space information indicating names of the files and locations of data of the files on the first virtual volume, and to write data of the files to the first virtual volume,
wherein the server computer is configured to delete a certain file in the first virtual volume so that a name of the certain file is not existed in the file name space information but in which data of the certain file is stored in the first virtual volume,
for processing of capacity reduction of the allocated area, the program comprising code for:

(A) specifying at least one undeleted file indicated by the file name space information;
(B) reading data of the at least one undeleted file from the first virtual volume, by the block access protocol;
(C) writing the data of the at least one undeleted file to a second virtual volume which is different than the first virtual volume, by the block access protocol,
wherein the second virtual volume is created for the capacity reduction using the virtual pool, so that the storage system is configured to allocate the physical storage area included in the virtual pool to the second virtual volume upon writing data to the second virtual volume;
wherein the first virtual volume is deleted so that allocated physical storage area of first virtual volume becomes unallocated physical storage area of the virtual pool; and
wherein the virtual pool includes the physical storage area in the storage system and does not include a physical storage area in another storage system.

8. The non-transitory computer-readable medium according to claim 7,
wherein the program comprises code for:
setting a first condition to start a processing of capacity reduction for a first allocated capacity range; and
setting a second condition to start a processing of capacity reduction for a second allocated capacity range.

9. The server computer according to claim 8,
wherein the program comprises code for displaying correspondence between the virtual volumes and the first and second conditions.

10. The non-transitory computer-readable medium according to claim 7,
wherein the program comprises a code for:
setting a first condition to start a processing of capacity reduction for the first virtual volume; and
setting a second condition to start a processing of capacity reduction for another virtual volume.

11. The non-transitory computer-readable medium according to claim 7,
wherein the server computer is coupled to another server computer,
wherein, in (C) storing data of the at least one file, the program includes code for (C1) sending the data of the at least one file to the another server computer so that the another server computer stores the data of the at least one file to the second virtual volume, and
wherein the program comprises a code for changing a single file name space shared by the server computer and the another server computer.

12. The server computer according to claim 7,
wherein the server computer is coupled to a host computer, and the processing of capacity reduction is transparent to the host computer.

13. A computer system comprising:
a storage system configured to define a virtual pool including a physical storage area of a storage media in the storage system and to provide a first virtual volume using the virtual pool so that the storage system is configured to allocate the physical storage area included in the virtual pool to the first virtual volume upon writing data to the first virtual volume; and
a server computer configured to:
when files are stored to the first virtual volume, write file name space information indicating names of the files and locations of data of the files on the first virtual volume, and write data of the files to the first virtual volume by a block access protocol;

delete a certain file in the first virtual volume so that a name of the certain file does not exist in the file name space information but in which data of the certain file is stored in the first virtual volume; and process a capacity reduction of the allocated area by:
- (A) specifying at least one undeleted file indicated by the file name space information;
- (B) reading data of the at least one undeleted file from the first virtual volume, by the block access protocol;
- (C) writing the data of the at least one undeleted file to a second virtual volume which is different than the first virtual volume, by the block access protocol, wherein the second virtual volume is created for the capacity reduction using the virtual pool, so that the storage system is configured to allocate the physical storage area included in the virtual pool to the second virtual volume upon writing data to the second virtual volume;

wherein the first virtual volume is deleted so that allocated physical storage area of first virtual volume becomes unallocated physical storage area of the virtual pool; and wherein the virtual pool includes the physical storage area in the storage system and does not include a physical storage area in another storage system.

14. The computer system according to claim 13, wherein the server computer is configured to:
set a first condition to start a processing of capacity reduction for a first allocated capacity range; and
set a second condition to start a processing of capacity reduction for a second allocated capacity range.

15. The computer system according to claim 14, wherein the server computer is configured to display correspondence between the virtual volumes and the first and second conditions.

16. The computer system according to claim 13, wherein the server computer is configured to:
set a first condition to start a processing of capacity reduction for the first virtual volume; and
set a second condition to start a processing of capacity reduction for another virtual volume.

17. The computer system according to claim 13, wherein the server computer is coupled to another server computer,
wherein, in (C) storing data of the at least one file, the server computer is configured to (C1) send the data of the at least one file to the another server computer so that the another server computer stores the data of the at least one file to the second virtual volume, and
wherein the server computer is configured to change a single file name space shared by the server computer and the another server computer.

18. The computer system according to claim 13, wherein the server computer is coupled to a host computer, and the processing of capacity reduction is transparent to the host computer.

* * * * *